US006909517B2

(12) United States Patent
Coleman et al.

(10) Patent No.: US 6,909,517 B2
(45) Date of Patent: Jun. 21, 2005

(54) METHOD FOR ASSESSING ACCURACY OF POSITIONING OF A MULTI-AXIS NUMERICALLY CONTROLLED MACHINE

(75) Inventors: Richard M. Coleman, Renton, WA (US); Russell C. McCrum, Redmond, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/957,823

(22) Filed: Oct. 4, 2004

(65) Prior Publication Data

US 2005/0043849 A1 Feb. 24, 2005

Related U.S. Application Data

(62) Division of application No. 09/537,364, filed on Mar. 29, 2000, now Pat. No. 6,819,974.

(51) Int. Cl.[7] .......................... G01B 11/14; G06F 19/00
(52) U.S. Cl. ....................................... 356/620; 700/195
(58) Field of Search ................................ 356/614, 616, 356/620; 700/100, 159, 177, 195, 614

(56) References Cited

U.S. PATENT DOCUMENTS

| | | | | |
|---|---|---|---|---|
| 4,118,871 A | * | 10/1978 | Kirkham ....................... 33/505 |
| RE31,247 E | | 5/1983 | Johnstone | |
| 4,451,185 A | * | 5/1984 | Yamakage ..................... 408/2 |
| 4,542,467 A | * | 9/1985 | McMurtry ................... 700/195 |
| 4,583,159 A | * | 4/1986 | Kanemoto et al. .......... 700/195 |
| 4,636,960 A | * | 1/1987 | McMurtry ................... 700/193 |
| 4,901,218 A | * | 2/1990 | Cornwell ....................... 700/2 |
| 5,257,460 A | | 11/1993 | McMurtry | |
| 5,691,909 A | | 11/1997 | Frey et al. | |
| 5,903,459 A | | 5/1999 | Greenwood et al. | |

OTHER PUBLICATIONS

Case Studies: *Aircraft Engineering and Aerospace Technology*; 1996; vol. 68, No. 6,– pp. 39–41.

* cited by examiner

*Primary Examiner*—Rodney Fuller
(74) *Attorney, Agent, or Firm*—Alston & Bird LLP

(57) ABSTRACT

A method is provided for assessing accuracy of positioning a NC machine having a spindle that is movable along each of at least two mutually orthogonal translational axes. The method Includes creating a master flame of reference relative to the translational axes by moving the machine along first and second translational axes. For each translational axis, coordinates of a target mounted adjacent the spindle are determined at a number of points along the respective translational axis. A linear fit of the coordinates is then calculated so as to create a set of mutually orthogonal axes defining the master frame of reference. Accuracy of positioning the machine in the master frame of reference is checked by positioning the spindle at a number of locations, measuring the coordinates of the target for each location, and determining errors in positioning of the machine by based upon the measured coordinates and machine-determined coordinates.

7 Claims, 16 Drawing Sheets

C-AXIS ALIGNMENT

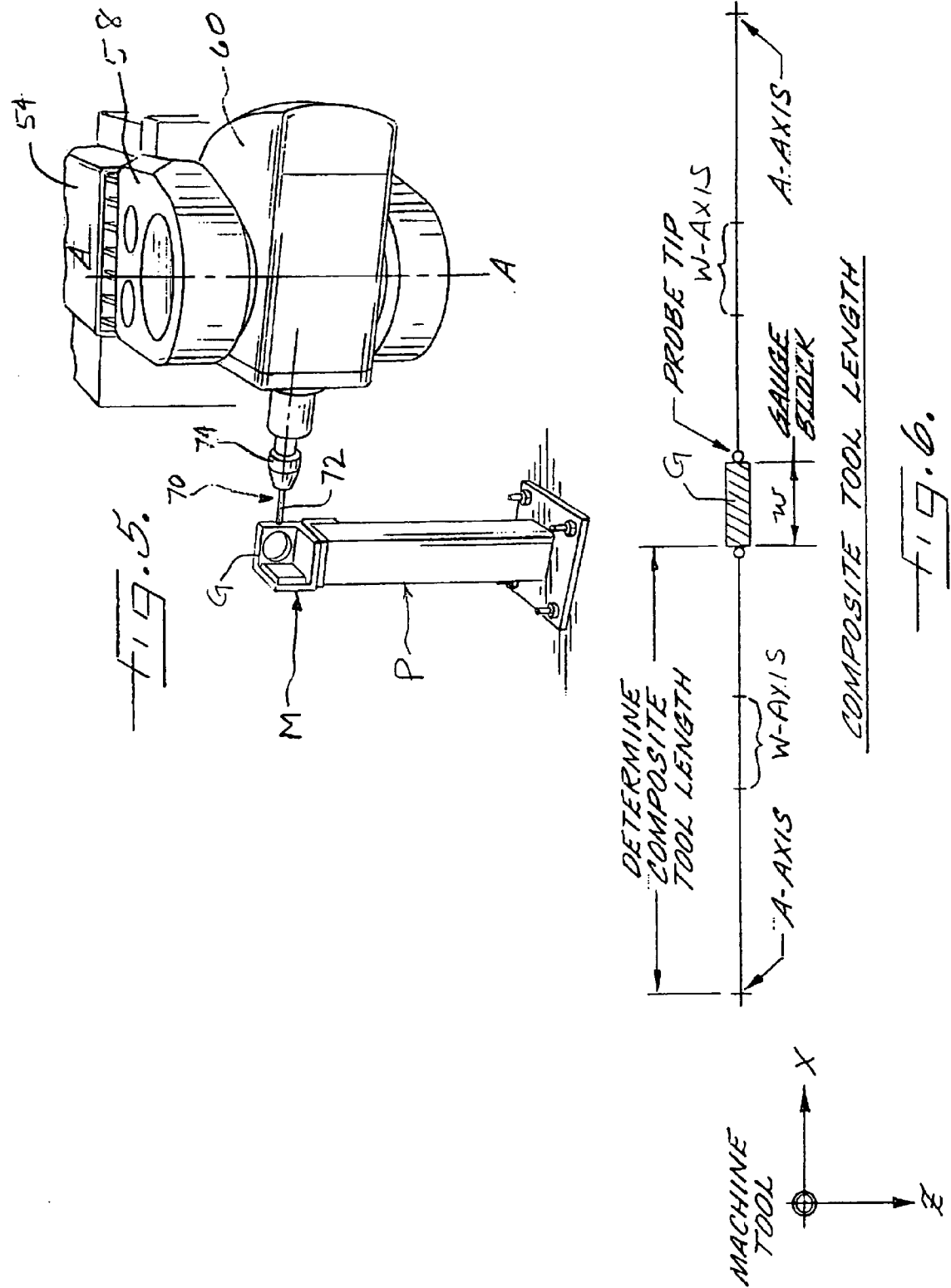

REPEATABLE POSITIONING OF MACHINE

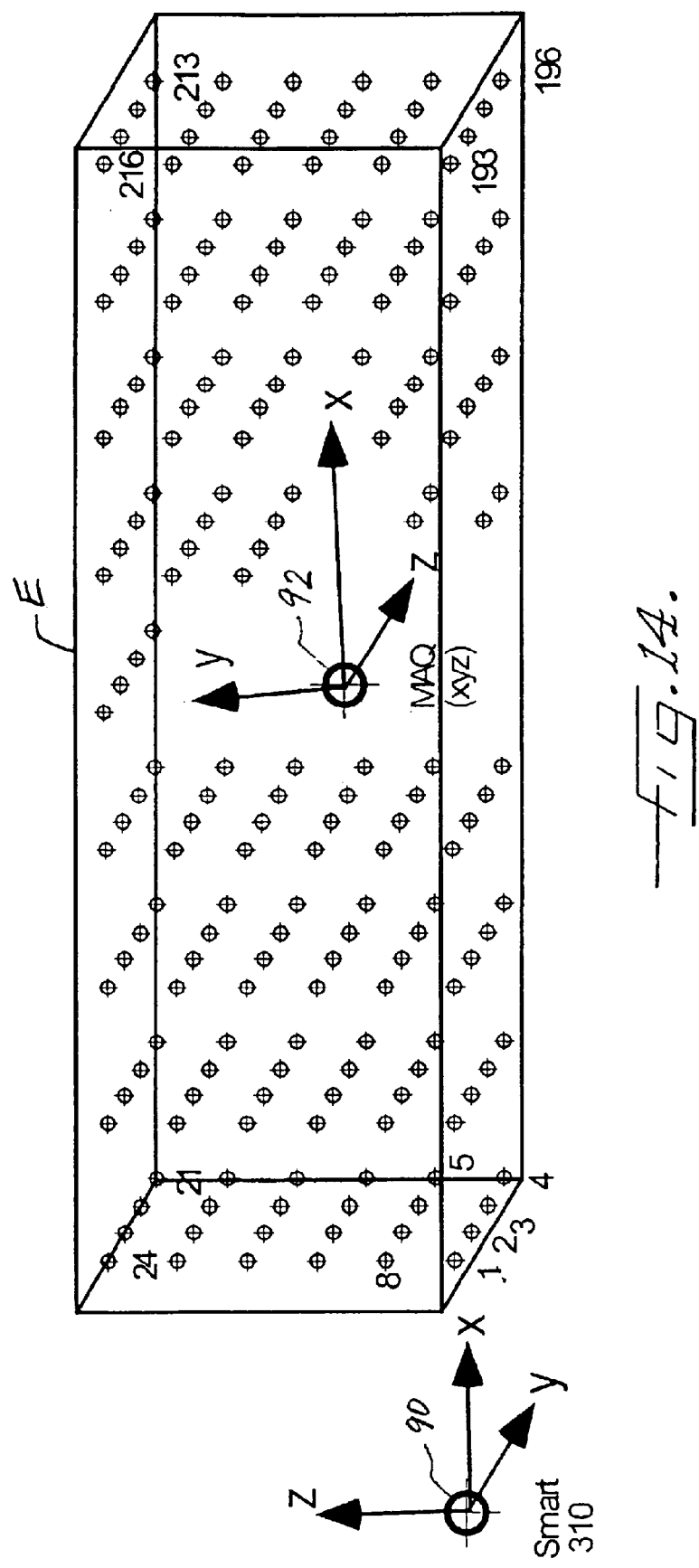

| PARAMETER AFFECTING HOLE MISLOCATION | PARAMETER TOLERANCE (INCH) | ERROR CONTRIBUTION, $\Delta S_i$ (INCH) |
|---|---|---|
| POGO Y AND Z LOCATION | 0.012 | 0.0071 |
| FIXTURE SET POINT BLOCK Z ERROR | 0.010 | 0.0042 |
| C-AXIS OFFSET IN Y | 0.003 | 0.0027 |
| COMPOSITE TOOL LENGTH | 0.005 | 0.0021 |
| MACHINE Z ERROR | 0.012 | 0.0101 |
| MACHINE Y ERROR | 0.012 | 0.0218 |
| WAC AXIS Z ERROR | 0.012 | 0.0051 |
| WAC AXIS Y ERROR | 0.005 | 0.0045 |
| DELTA R BETWEEN POGOS | 0.050 | 0.0120 |
| PANEL ANGLE CHANGE EFFECT | 1 DEGREE OVER 3 INCHES | 0.0005 |
| LOCATOR PIN ERROR | 0.003 | 0.0027 |
| DRILL C-AXIS OFFSET | 0.002 | 0.0020 |
| DRILL ENTRY WANDER | 0.002 | 0.0020 |
| | | |
| | TOTAL ERROR, $\Delta S$ | 0.0294 |

Fig. 20.

METHOD FOR ASSESSING ACCURACY OF POSITIONING OF A MULTI-AXIS NUMERICALLY CONTROLLED MACHINE

CROSS REFERENCE TO RELATED APPLICATIONS

This application is a divisional of U.S. application Ser. No. 09/537,364, filed Mar. 29, 2000 now U.S. Pat. No. 6,819,974, entitled Process for Qualifying Accuracy of a Numerically Controlled Machining System, which is incorporated herein in its entirety by reference

FIELD OF THE INVENTION

The invention relates to numerically controlled machines used for machining workpieces, and particularly to methods for qualifying the accuracy of such machines to ensure that parts will be produced within acceptable tolerances. The invention relates more particularly to a process for qualifying the accuracy of a machining system having a numerically controlled machine and a flexible workpiece holding fixture, and for diagnosing sources of errors and correcting such sources of errors.

BACKGROUND OF THE INVENTION

Numerically controlled machine tools are widely used for machining many types of parts. In the aircraft industry, gantry-type and post mill-type machines having multi-axis movement capabilities are used for machining wing and fuselage panels to form holes in which rivets, bolts, or similar fasteners will be installed for attaching various structures and components to the panels. The panels in many cases are quite large, and are held for machining by a flexible workpiece holding fixture whose configuration can be varied to match a given workpiece so that panels of various configurations can be fixtured. A machine tool, such as a five-axis tool that is translatable along three mutually orthogonal axes and rotatable about two orthogonal axes, is positioned opposite the holding fixture and is translated and rotated to position a tool held in a spindle of the machine in the proper locations for drilling holes through the workpiece or performing other machining operations.

In such a system, it will be appreciated that there are many degrees of freedom between the machine tool and the holding fixture. Accurate parts can be produced only if there is a high degree of confidence that the accuracy in positioning of the machine tool and the holding fixture are within acceptable limits. However, there are many potential sources of errors that can creep in, both within the machine tool and within the holding fixture. Potential sources of errors in the machine include mechanical misalignments of and between the linear ways of the machine along which the machine travels, and mechanical misalignments of and between the rotational axes of the machine. Additionally, where the workpiece holding fixture includes holding elements that can be variably positioned along one or more axes, the fixture may introduce further inaccuracies along and between such axes.

Traditional methods for checking and correcting positioning errors in such machine systems have relied heavily upon recalibrating and realigning the machine to original factory specifications when the errors become unacceptably large. This can involve the replacement of parts of the machine that can no longer deliver performance up to par with the original specifications. Many times, the errors in positioning are judged by inspecting the finished part quality and noting when the parts become out of tolerance. This is an inherently reactive rather than proactive process, and inevitably unacceptable parts will be produced at some point when the machine accuracy declines as a result of wear, shifts between parts of the machine, or other causes.

A further drawback to this traditional approach is that it may well be possible to produce parts within acceptable tolerances even though the machine does not meet original factory specifications. Accordingly, realigning the machine to original specifications may result in needless downtime and expense. In order to efficiently correct inaccuracies without rebuilding the machine to original specifications, however, the root causes of the errors must be known. In the traditional approach to machine accuracy qualification, errors are first noted by checking the finished part quality, but this yields little or no insight into what is causing the parts to be produced out of tolerance. The traditional approach therefore involves a long and cumbersome process of measuring the linearity and straightness of each axis of the machine, the squareness between each pair of orthogonal axes, the alignment of the rotation axes, and other parameters, and correcting any unacceptably large inaccuracy by realigning the axes and replacing parts as needed in order to reestablish the original factory specifications. In this process, the true root causes of errors may not ever be discovered; it is simply hoped that by realigning the machine to original specifications, the finished part quality will be restored to an acceptable level.

A further drawback to many prior machine accuracy qualification methods is that the ultimate error in production part accuracy is never linked mathematically to the various contributing factors in the machine and/or holding fixture for the part, and hence there is no systematic way to check the machine and fixture accuracy that will assure that parts will be produced within acceptable tolerances. Accordingly, it is generally necessary to inspect the finished parts to determine whether the machine system is performing acceptably. It would be desirable to provide a machine accuracy qualification method in which the production part accuracy is mathematically linked to the various potential sources of error in the machine and holding fixture, enabling a high degree of confidence in production part accuracy to be achieved without having to regularly inspect the parts. In short, many prior attempts to maintain a high level of confidence in the accuracy of machines and fixtures have failed because of a misunderstanding of what needs to be checked, because the time between accuracy checks was unacceptably long, and because methods for collecting, analyzing, and reporting measurement data were incomplete and the results difficult to interpret.

SUMMARY OF THE INVENTION

The present invention seeks to overcome the drawbacks of prior approaches noted above. In accordance with the present invention, a hierarchical process for checking machine and fixture accuracy is provided that leads to the identification of the likely root causes of errors so that, if necessary, physical intervention can be taken to correct them. In many cases, however, the errors can be corrected without physical intervention, by making corrections within software. Machine and fixture positioning errors are related through a mathematical model to the statistical total error in the position of the machine tool (e.g., a drill bit for drilling holes), and maximum allowable amounts are assigned for each of the individual contributing factors to the total error. The math model in accordance with the invention allows all of the errors or tolerances of the machine and holding fixture to be distributed in a realistic manner in order to keep the resulting accuracy in production parts within acceptable limits. Periodic machine and fixture accuracy checks are made to assess whether each of the contributing causes of the statistical total machine tool position error is within its assigned tolerance band. The invention provides a systematic accuracy qualification process for making the periodic checks in such a manner that the root causes of the machine and fixture errors can readily be traced and corrected. The invention thereby seeks to allow the highest possible levels of hardware inaccuracies that still enable parts to be produced within acceptable tolerances. In this manner, the frequency of physical intervention is minimized, and when physical intervention is necessary, the likely root cause of error is identified so that extensive downtime to identify and correct the cause is unnecessary.

The process of the invention also enables the accuracy of the machine and fixture to be determined without requiring any foundation-based reference system or any other reference system external to the machine. Instead, a master-slave relationship is defined between the machine and the holding fixture, and the accuracy of the machine and fixture are checked within a master frame of reference that is relative to the axes along which the machine moves. Accordingly, it is not necessary in most cases to calibrate the machine to ground and gravity, as required in many prior art processes, in order to assure that production parts will be produced within tolerance.

To these ends, the process in accordance with at least some embodiments of the invention involves making regular periodic checks of the machine positioning accuracy and the relationship between the machine and the workpiece holding fixture using a measurement probe that is mounted in the tool-holding spindle of the machine where the machine tool (e.g., a drill bit or the like) would ordinarily be held. The checks are performed in a particular order such that in each check, errors can be attributed to a cause or multiple causes that are substantially independent of any other inaccuracies that have not already been identified and corrected in previous steps of the process. The process is suitable for use with any multi-axis machine tool. Embodiments of the invention described herein focus particularly on a machine of the type that travels along linear ways defining translation axes of the machine; typically, there are at least two orthogonal translation axes, and often there are three mutually orthogonal axes along which the machine can be moved to position the tool at any point in a three-dimensional volume. For example, the machine may include a gantry, post, or other prime mover that travels along ways on a floor along an X-axis direction, and a ram of the machine may travel vertically along the prime mover along a Y-axis and forward and backward on the prime mover along a Z-axis. The machine frequently will be further capable of rotating the tool about one or more axes so that the orientation of the tool axis can be varied. For example, the spindle may be mounted on a wrist that is mounted on the ram, the wrist having a head that rotates on the ram about one rotational axis and a body rotatably mounted in the head about another rotational axis. Based on the present disclosure it will be recognized by those of ordinary skill in the art, however, that the methods of the present invention can be applied to any multi-axis numerically controlled machine.

Thus, in one embodiment, the measuring probe is mounted in the machine's spindle, and initially the alignment of the probe with the rotation axis of the head of the machine wrist is checked. More particularly, the accuracy of alignment of the probe relative to the rotation axis of the head is measured by rotating the head about its axis and moving the machine to cause the probe to contact a fixed monument or reference surface. If the probe measures a different position for the monument in two different rotational positions of the head, this is an indication of probe misalignment or other abnormality. The likely causes of the shift in measured position of the monument are traced and corrected.

The accuracy with which the machine can be repeatably positioned along each of its translation axes is checked by moving the machine independently along each axis to cause the probe to contact the monument, and detecting inaccuracies based on the positions of the monument measured by the probe. If this check fails, then the probe length may be different from what it is supposed to be, or the monument may have shifted, or the machine may have shifted. Each potential cause of errors in rotational and translational positioning accuracy and axis alignment is investigated, and corrected if necessary, before proceeding further with the accuracy qualification process, or before proceeding with the machining of parts.

The checks with the probe against the monument are useful for detecting certain probe-caused errors and machine-caused errors that may result in parts being produced out of tolerance. However, there are many other potential sources of errors that the monument checks cannot detect. For example, the monument checks do not provide any information as to potential errors that may be introduced in the workpiece holding fixture and the relative positioning of the fixture and machine. Additionally, the monument checks are not designed to check linearity and orthogonality of the machine's axes over the entire working envelope of the machine, nor are they designed to check accuracy of the translational and rotational positioning of the machine over the entire ranges of machine movements that are employed during production.

Accordingly, after the monument checks have been satisfactorily completed, and any inaccuracies detected therein have been traced and corrected, the measurement probe is used to probe the workpiece holding fixture. In one embodiment, the fixture includes a plurality of holding members that are movable along at least one axis so that the fixture can be tailored to the configuration of the workpiece being machined. More preferably, the fixture's holding members can be moved independently along two or three mutually orthogonal axes. The fixture is numerically controlled by a control unit of the fixture, which makes its own internal determination of where the holding members are positioned, for instance according to feedback position signals from actuators that move the holding members and respond to control signals telling the actuators where to position the holding members. It will be appreciated that if the holding members are not positioned where the machine "thinks" they are positioned, then inaccuracies will be introduced in finished parts. Thus, the fixture is configured with the holding members placed in predetermined positions, and the machine is moved to cause the probe to contact the holding members along each axis along which the holding members are movable. The probe-measured positions of the holding members are compared to desired positions, and delta values representing the discrepancies between actual and desired positions are determined along each axis for each holding member. The delta values are then accounted for in the software of the holding fixture's control unit so as to "zero out" the discrepancies. Ideally, the holding fixture can then be placed in the probed configuration and the holding members will be where they are supposed to be.

To check the holding fixture over the entire working envelope in which it may be used, a post-calibration check preferably is done by placing the fixture in various other configurations with the holding members in positions different from those used in the initial probe check. The actual positions of the holding members as determined by the machine and probe are compared with desired (i.e., the commanded) positions, and delta values are again calculated for each configuration. If the delta values in any configuration for any of the holding members exceed a threshold limit, then software corrections of the holding fixture are not adequate to correct the problem, and physical intervention is undertaken to bring the fixture back into acceptable accuracy so that it can pass the probe checks.

It is advantageous to perform the probe checks of the holding fixture on a regular periodic basis, but satisfactory control of the machine-fixture relationship may be maintained even though the probe checks of the fixture are performed less frequently than the monument checks of the machine accuracy. For example, the machine monument checks may be performed on a daily basis prior to the start of or between production operations, whereas the probe checks of the fixture may be performed weekly. Of course, these periods are merely exemplary.

As noted above, the order in which the various accuracy checks are performed forms a part of at least some embodiments of the invention. It is preferable to perform the checks in an order that rules out possible causes of inaccuracies in a logical order. For instance, a check of the holding fixture with the probe should not be done until it is known that the machine positioning accuracy is acceptable. Accordingly, a method for qualifying the machine accuracy in one embodiment includes the steps of:

(1) mounting a contact measuring probe in a spindle of the machine where a machine tool would ordinarily be mounted for machining, and checking positioning accuracy of the machine by moving the machine to cause the probe to contact a fixed monument in a known position such that the probe measures a position of the monument, and proceeding to the next step only if the probe-measured position of the monument is within a predetermined tolerance of the known position;

(2) subsequently checking positioning accuracy of the holding fixture by moving the machine to cause the probe to contact each of a plurality of holding members of the fixture that have been placed in positions determined within a numerical control unit of the holding fixture that controls positioning of the holding members, such that the probe measures a position of each holding member; and (3) proceeding to machining operations only if the probe-measured position of each holding member that was checked is within a predetermined tolerance of the position determined within the numerical control unit of the holding fixture.

In a further embodiment, the length and alignment of the probe and the accuracy and alignment of the machine's rotational axes are first qualified by moving the machine to probe the fixed monument, then the machine accuracy along its translational axes is checked using the probe against the monument. Once these checks have passed, the probe check of the holding fixture is performed.

In a particular embodiment of the invention described herein, the holding fixture has a plurality of parallel, spaced-apart columns each of which supports a plurality of extendable and retractable pogos with vacuum assemblies for suctioning a workpiece onto the holding fixture and securing it for machining. The pogos are translatable along the column on which they are mounted, in a direction nominally parallel to a Y axis of the machine. The columns are translatable in a direction nominally parallel to an X axis of the machine. The pogos extend and retract along a direction nominally parallel to a Z axis of the machine. The machine translates in the X direction along ways on a floor. A ram of the machine translates along the Y and Z axes on ways mounted on the machine. A wrist is rotatably mounted on the ram. A head of the wrist rotates on the ram about a C axis that is nominally parallel to the Z axis. A spindle-holding body of the wrist is rotatably mounted on the head so as to rotate about an A axis that is nominally perpendicular to the C axis. The spindle of the machine is mounted on the body. The spindle is translatable along a W axis toward and away from the A axis.

The measuring probe is mounted in the spindle such that the lengthwise axis of the probe is aligned along the W axis. The length of the probe from the A axis out to a tip of the probe is set to a predetermined length. The length and alignment of the probe are checked by moving the machine to cause the probe to contact a fixed monument mounted on the floor proximate the machine. Preferably, a first step involves placing the spindle-holding body of the machine in a home position in which the W axis is supposed to be colinear with the C rotation axis of the wrist. With all other axes of the machine fixed, the machine is moved along the X direction to cause the probe to touch two diametrically opposite points on the inner edge of a circular hole formed in a fixed monument. The plane of the circular edge of the hole lies in the nominal XY plane of the machine; thus, the axis of the probe is nominally parallel to the axis of the hole. The machine is then moved to position the probe at the midpoint between the two X points and is moved along the Y direction to cause the probe to touch two diametrically opposite points on the circular edge. From these X and Y points, the X and Y coordinates of the center of the circular hole are calculated. Next, the wrist of the machine is rotated 180 degrees about the C axis and X and Y points of the edge of the hole are measured with the probe. If the X and Y coordinates of the center of the hole calculated after the rotation about the C axis are not within predetermined tolerances of the coordinates calculated before the rotation, then it means that there is possible misalignment of the probe axis relative to the C axis. Various causes may be responsible for the difference in calculated centers of the hole, including bent microswitches in the probe mechanism, bending of the shaft of the probe, inaccuracy in the home position of the spindle-holding body about the A axis, and/or nonorthogonality of the A axis relative to the C axis. Each potential cause is investigated, and corrected if necessary, before proceeding to further steps of the process.

The length of the probe from the A axis to the probe tip is checked by positioning the wrist such that the probe extends parallel to one of the translational axes of the machine, such as the X axis, and moving the machine along this axis to cause the probe tip to contact one side of a fixed monument, and the position of the side of the monument is measured. The spindle-holding body is then rotated 180 degrees such that the probe extends in an opposite direction but still parallel with the translational axis of the machine, and the machine is moved along this axis to cause the probe tip to contact and measure the position of an opposite side of the monument. The distance between the opposite sides of the monument in the direction of the translational axis is known. Based on this known distance and the measured positions of the opposite sides of the monument, the length of the probe from the A axis to the tip is calculated. If the calculated length is not within a predetermined tolerance of a desired value, the possible causes of the discrepancy are investigated and corrected.

Once the monument checks have assured that the probe length is correct and the orthogonality of the A axis relative to the C axis is acceptable, the accuracy of the machine's translational positioning along the X, Y, and Z axes is checked by moving the machine along each axis, one at a time, so as to probe a fixed monument having surfaces whose positions along each axis are presumed to be known. The monument advantageously can be the same monument used in the previous checks; more specifically, the accuracy of machine positioning along the X and Y axes is checked by probing the inner edge of the circular hole in the monument. X and Y position coordinates are measured for at least three points spaced apart about the edge of the hole, and from these points the X and Y coordinates of the center of the hole are calculated. If the calculated center is not within a predetermined tolerance of a previously taught center, the possible causes are investigated and corrected. Similarly, the machine accuracy along the Z axis is checked by moving the machine in the Z direction to probe a surface of the monument, and comparing the measured position of the surface with a known position, and possible causes of any unacceptably large discrepancy are investigated and corrected. The primary causes of discrepancies in the X, Y, and Z positions measured for the monument include a shift of the machine along its translational axes, or a shift of the monument.

After the machine translational accuracy has been checked with the probe, preferably the accuracy of rotational positioning of the wrist about the C axis is checked. The wrist is rotated about the C axis to a position in which the probe should nominally extend parallel to the X axis. The machine is moved along the Y axis to cause the probe to touch a surface of a fixed monument, and the Y position of this surface is measured by the probe. The wrist is then rotated 180 degrees about the C axis, and the machine is again moved to cause the probe to measure the Y position of the same surface. If the two measured Y positions do not agree with each other within a predetermined tolerance, the possible causes of the discrepancy are investigated and corrected. The primary cause is inaccuracy in rotational positioning of the wrist about the C axis; that is, the rotation was less than or more than 180 degrees by some amount.

Preferably, the accuracy check of the holding fixture is performed only after all of the monument checks have been successfully completed. In a pre-calibration check of the fixture, the control unit of the fixture is caused to extend or retract certain ones of the pogos to a predetermined Z position, for instance such that all of the selected pogos are at Z=12 inches. These pogos are spaced apart in the X and Y directions preferably over the entire working envelope of the machine. The movable columns on which these pogos are mounted are placed in predetermined X positions, and the pogos are placed in predetermined Y positions along each column. The machine is then moved along each X, Y, and Z axis to cause the probe to contact surfaces of the vacuum assemblies that are mounted on the ends of the pogos. The X, Y, and Z positions of these surfaces are measured by the machine's probe and are compared with the positions determined by the fixture's control unit. Delta values between the probe-measured and fixture-determined X, Y, and Z positions are calculated, and are used in the fixture's control unit as offset values to "zero out" the discrepancies.

A post-calibration check can be performed after the delta values have been applied in the fixture's control unit. Preferably, pogos are placed in a plurality of different X, Y, and Z positions spaced throughout a working volume of the machine and are probed by the machine to determine X, Y, and Z delta values. If the delta values exceed predetermined tolerances, then zeroing out the discrepancies within the fixture's control unit is not adequate to correct the fixture positioning inaccuracies, and physical intervention is needed to correct the problem.

It will be appreciated that the probe checks alone are not adequate to detect and diagnose certain sources of errors in machine accuracy. The monument checks are typically made with the machine moving over only a relatively small volume of space, whereas in production the machine must move over a much larger volume of space. The monument checks thus are not designed to detect errors in, for example, straightness of the machine ways or orthogonality of the translation axes. Accordingly, the process in accordance with preferred embodiments of the invention includes a further machine accuracy check to determine the overall global positioning accuracy of the machine along its translation axes and about its rotation axes. The global positioning check advantageously employs a three-dimensional position-measuring device, desirably a laser tracker or other laser measuring instrument, that is capable of measuring the three-dimensional coordinates of a target mounted on the machine adjacent the spindle where a tool would ordinarily be held. Preferably, the measuring instrument is first used to create a master frame of reference that is relative to the ways of the machine. This is accomplished by moving the machine along only one axis, for example the X-axis defined by ways that extend along the floor, and using the measuring instrument to measure the positions of the target at each of a plurality of points spaced along the X-axis direction. The same procedure is performed along the Y-axis, which is nominally perpendicular to the X-axis. A linear best fit of the points measured by the measuring instrument is performed to determine a mutually orthogonal set of coordinate axes defining a master frame of reference based on the machine's own translation axes. This best-fit process distributes errors in linearity and orthogonality of the machine's translation axes over the working envelope of the machine. By creating the master frame of reference relative to the ways of the machine, the invention eliminates the need for establishing a foundation-based reference system or any other reference system external to the machine.

Once the master frame of reference is determined, the machine accuracy is checked by moving the machine so as to position the spindle at each of a plurality of locations that are preferably spaced apart along each translation axis throughout the working envelope of the machine, measuring the coordinates of the target with the measuring instrument for each location, and determining errors in positioning of the machine by comparing the measured coordinates with machine-determined coordinates determined within the numerical control unit of the machine. If any discrepancy between the position measured by the measuring instrument and the machine-determined position exceeds a threshold limit (or, alternatively, if a statistical aggregation of all of the errors exceeds a threshold limit), then physical intervention is employed to correct the machine so that it can pass the global positioning accuracy check. Advantageously, the machine accuracy is checked only within the working envelope (i.e., the 3-D space within which the machine is required to move during machining operations), rather than checking the machine accuracy over the entire range of movement capability of the machine. This minimizes the time required to collect the accuracy data.

A similar positioning accuracy check is performed for the A and C rotation axes and the W spindle axis of the machine, by fixing the translation axes and placing the machine in various positions through movements about the A and C axes and along the W axis. The positions of the target are measured by the measuring instrument and are compared to the positions determined within the machine. Differences between the measured positions of the target and the machine-determined positions are compared with threshold limit values to determine whether physical intervention is needed to bring the machine within acceptable accuracy.

The machine accuracy positioning checks can also include dynamic accuracy checks wherein the machine is commanded to move along a predetermined curve (e.g., a circle) in each of the XY, YZ, and XZ planes, and the position of the target is measured at each of a plurality of points along the curve. Discrepancies between the measured positions and the desired positions can be due to various potential causes including lack of orthogonality between the axes of the machine or inaccuracy in translational positioning along the machine axes. The dynamic checks allow data from perpendicular planes to be directly related in straightness, squareness, and accuracy.

The global positioning accuracy checks using the measuring instrument are preferably performed on a regular periodic basis, but may be less frequent than the probe checks of the fixture. For instance, the global positioning accuracy check advantageously can be performed on a monthly basis.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 5 is a perspective view of the machine during a probe check against the fixed monument for checking the length of the probe;

FIG. 6 is a top elevation of the monument depicting measurement that are made with the probe for determining the length of the probe;

FIG. 14 is a diagrammatic illustration of the various points spaced throughout the three-dimensional working envelope of the machine at which the position of the machine is measured by laser tracker during the global positioning accuracy check;

FIG. 20 is a table showing a numerical example of the significant error sources in the machine and holding fixture depicted in the drawings, and showing the resulting statistical total error in machine tool position.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
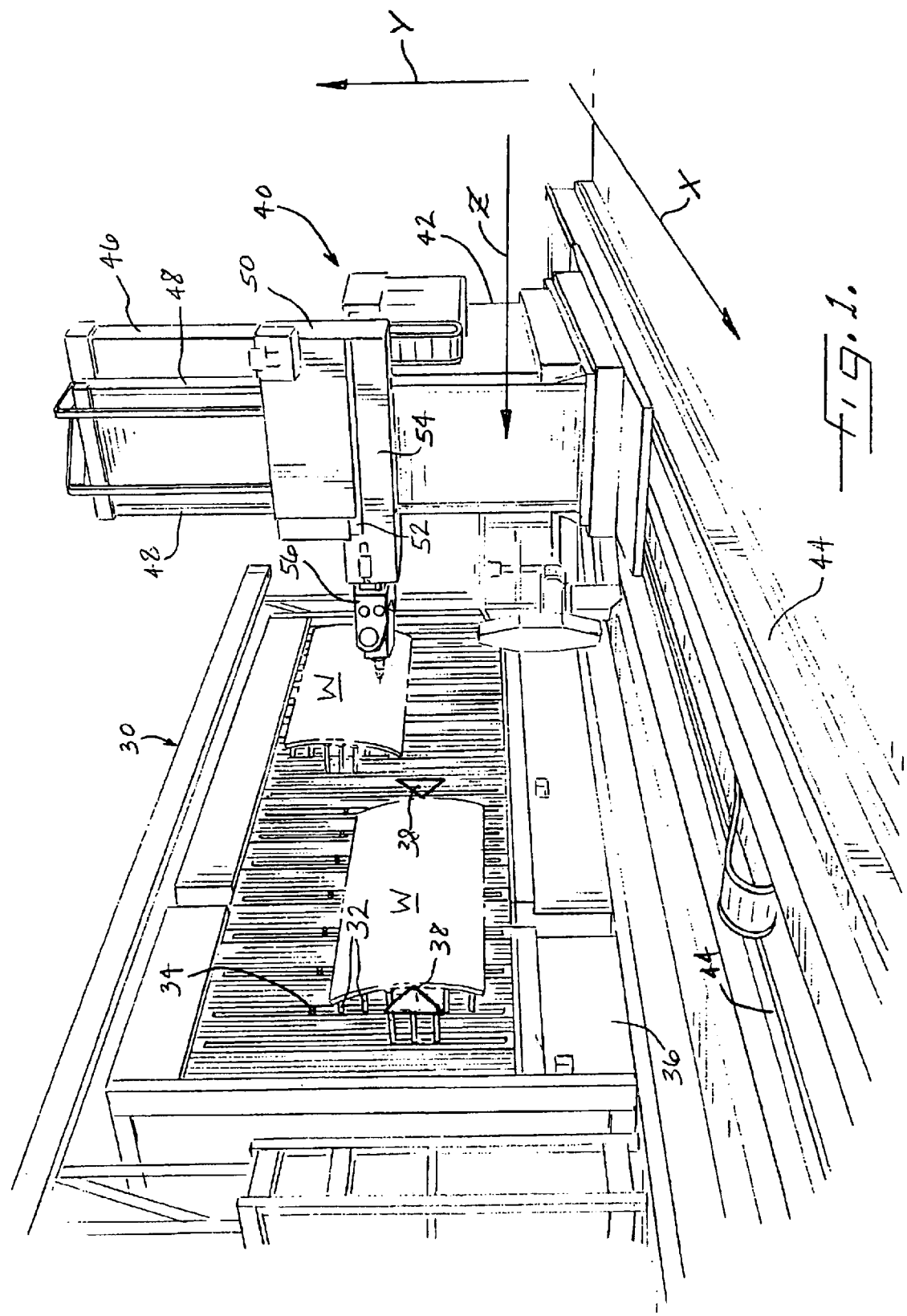
FIG. 1 is a perspective view of one type of machining system to which the process of the present invention is applicable.

FIG. 1 depicts one type of machining system to which the present invention is applicable. The machining system is used for machining large panel-shaped workpieces W such as panels of a fuselage for an aircraft. In the assembly of aircraft fuselages, a variety of items are fastened to fuselage panels including stiffening ribs, brackets, systems components, and others. The panels must be drilled with holes to allow fasteners such as rivets, bolts, or the like, to be inserted for attaching the various structures to the panels. It is important that the holes be machined accurately in terms of position and orientation. The workpieces W are fixed in position for machining by a flexible holding fixture 30. The holding fixture is described in greater detail below, but for present purposes it is sufficient to note that the fixture includes a plurality of extendable and retractable rods or pogos 32 each of which has a vacuum assembly 34 mounted on its end that faces the workpiece. The vacuum assembly 34 includes a vacuum cup that is connected to a source of vacuum (not shown) so that the workpiece W can be suctioned against the pogo 32. The pogos 32 are each extended to the appropriate extent so that they collectively match the contour of the workpiece and so that the workpiece is fixed against the holding fixture in a predetermined orientation. The positioning of the pogos 32 is controlled by a numerical control unit 36 of the holding fixture, which is in communication with actuators (not shown) that extend and retract the pogos.

The machining system also includes a numerically controlled machine 40 that is translatable and rotatable about a plurality of axes and carries a tool-holding spindle (described below) in which a tool such as rotary cutter can be mounted. The machine 40 in the illustrated embodiment is a five-axis post mill machine, but the invention is not limited to post mill machines, as will be recognized by those skilled in the art. The machine includes a prime mover 42 that travels along rails or ways 44 installed along a horizontal floor. The prime mover 42 of the post mill machine comprises the post; for a gantry-type machine, the prime mover would be the gantry beam or cross-beam. The ways 44 are linear and parallel, defining an X axis direction along which the machine can be translated. The machine includes a suitable actuator (not shown) for moving the machine along the X axis.

The prime mover 42 includes a post or vertical column 46 extending upwardly therefrom. A pair of linear, parallel rails or ways 48 are mounted on the vertical column 46 and define a Y axis that is perpendicular to the X axis. A slide 50 is slidably mounted on the Y-axis ways 48. The slide 50 is moved vertically up and down along the prime mover 42 by a suitable actuator (not shown).

The slide 50 includes linear rails or ways 52 that extend along a Z axis direction perpendicular to the X and Y axes. A ram 54 is slidably mounted on the ways 52 of the slide so as to be movable in the Z axis direction toward and away from the holding fixture 30. An articulated wrist 56 is mounted on the ram 54.

Figure 2:
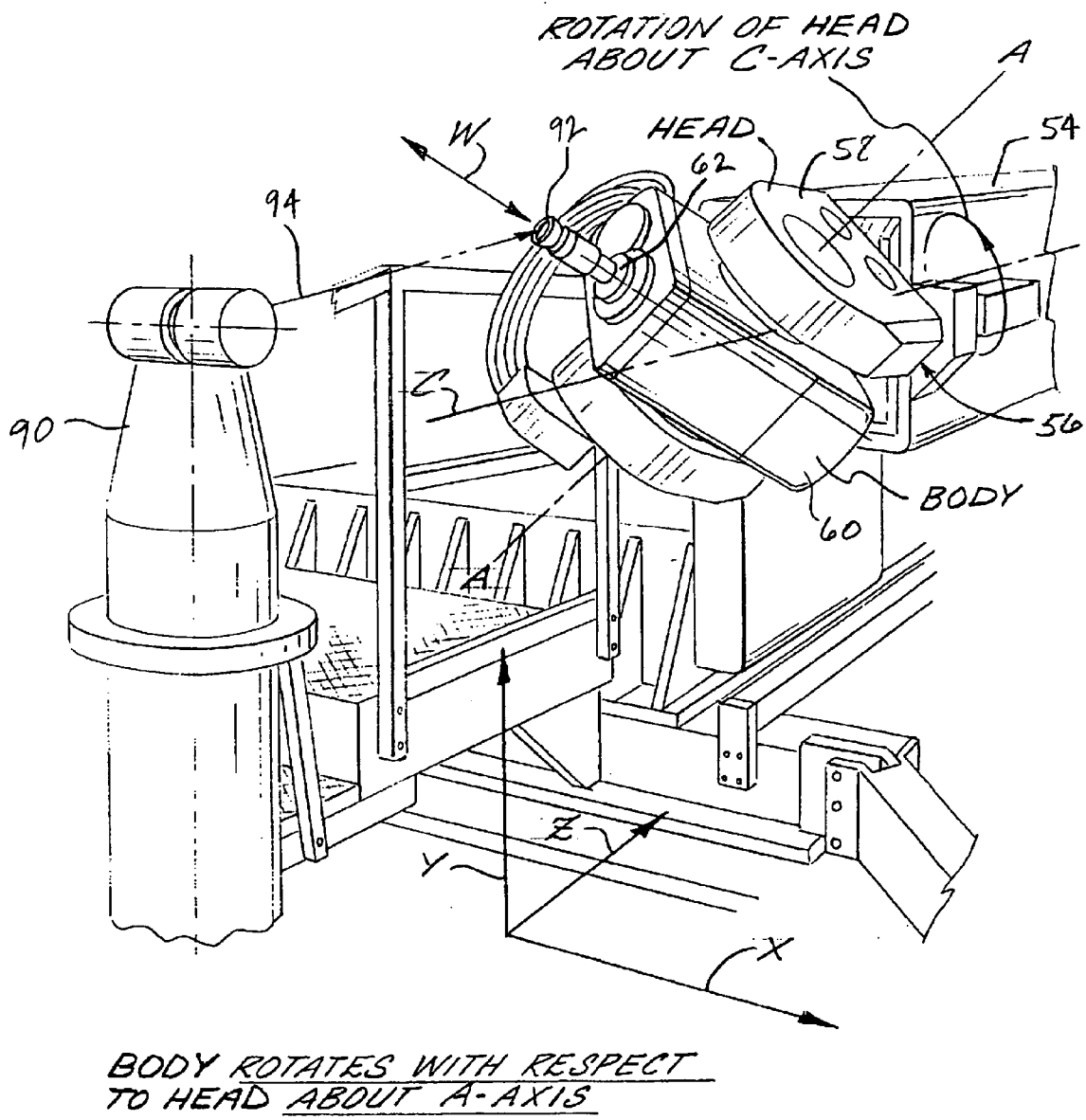
FIG. 2 is a perspective view of a portion of the machine, illustrating the translational and rotational axes of the machine, and also showing a laser tracker being used to track positioning accuracy of the machine.

The wrist 56 is best seen in FIG. 2. The wrist 56 includes a head 58 that is mounted on the ram 54 so as to be rotatable relative to the ram about a C axis. The head 58 includes a pair of spaced-apart parallel fork members between which a body 60 is rotatably mounted so as to be rotatable relative to the head 58 about an A axis. Suitable actuators (not shown) provide motive force for rotating the head 58 about the C axis and for rotating the body 60 about the A axis. The body 60 supports an extendable and retractable tool-holding spindle 62 that is operable to hold a machine tool such as a drill bit or other rotary cutter (not shown) and to rotate the tool about the axis of the spindle, which is nominally aligned with the C axis of the machine when the body 60 is in a home position. The spindle 62 is further operable to extend and retract the machine tool along a W axis that nominally coincides with the rotation axis of the spindle. The movement of the spindle 62 along the W axis is provided by a suitable actuator (not shown). This movement of the spindle is used for plunging a rotary cutter into and through a workpiece, as when drilling a hole. All of the actuators providing movements of the machine along the X, Y, Z, W, A, and C axes are in communication with a numerical control unit 64 (FIG. 13A) that controls movement and positioning of the machine.

The accuracy of machining operations performed on a workpiece held in the holding fixture 30 is dependent on the machine 40 being positioned accurately as the machine executes various movements along and about its translational and rotational axes. These movements are controlled by programming a set of numerical control instructions in the control unit 64 of the machine. The instructions are defined relative to an orthogonal coordinate system based on the machine's XYZ axes. Accordingly, one factor that can adversely affect accuracy of machining operations is nonlinearity of any of the X, Y, and Z axes and/or nonorthogonality of these axes. The machine control instructions also presume that the C axis is parallel to the Z axis, that the A axis is perpendicular to the C axis, that the W axis is perpendicular to the A axis, and that the spindle is located along the W axis direction at a known distance from the A axis. Accordingly, to the extent that any of these presumptions are incorrect because of inaccuracies in the alignment of and relationships between the W, A, and C axes, the accuracy of positioning of the machine tool held in the spindle will be compromised. It will be recognized by those knowledgeable in the field of numerical controlled multiaxis machines that the machine 40 illustrated herein corresponds to a five-axis post mill machine manufactured by Aeroflex, Inc. of Rockford, Ill.

The accuracy of machining operations also depends on accuracy of the holding fixture 30. As noted above, the positioning of the pogos 32 of the holding fixture is controlled by the numerical control unit 36 for the fixture. The control unit 36 is programmed with numerical control instructions defining the positions in which the pogos are to be positioned so as to fix the workpiece in the desired position and orientation relative to the machine 40. The control instructions presume a known positional relationship between the holding fixture 30 and the machine 40. If the relationship between the holding fixture and the machine is different from the presumed one, accuracy of machining operations will be adversely affected. This can be caused, for example, by misalignment of the axes of the pogos 32 relative to the Z axis of the machine. In the illustrated machining system, the axes of the pogos along which the pogos are extended and retracted are intended to be parallel with the Z axis. Inaccuracy can also arise because of inaccurate positioning of the pogos along their axes. Thus, it is apparent that there are a fairly large number of potential problems that can lead to inaccuracies in finished parts produced in the machining system. The present invention seeks to provide a methodical process by which the degree of inaccuracies can be quantified and the root causes of the inaccuracies can be traced and corrected. The invention further seeks to minimize the amount of physical intervention that is needed to correct the inaccuracies.

Checks of Machine and Probe Relative to Fixed Monument

To assess the accuracy with which the machine can be positioned along its translational X, Y, and Z axes, the positioning of the machine relative to a fixed monument is checked with a contact measuring probe. FIGS. 3 through 10 illustrate a series of checks that are made in this regard. For the probe checks, a contact measuring probe 70 is mounted in the tool-holding spindle 62 where the machine tool would ordinarily be held. The contact measuring probe 70 advantageously can be a touch trigger probe manufactured by Renishaw PLC of Gloucestershire, United Kingdom, such as the Model MP-3 touch probe made by Renishaw. Such a probe includes a stylus 72 that is mounted in a probe head 74. Within the probe head 74 are a plurality of contact sensors (not shown) that can detect very slight deflections of the stylus in any direction, such as caused by the probe coming into contact with an object as the probe is moved.

The probe 70 is in communication with the numerical control unit 64 (FIG. 13A) of the machine 40, such that when the tip of the stylus 72 makes contact with an object as the machine is moved, the probe causes the machine's control unit to determine the position of the machine along its axes; thus, the position of the object contacted by the probe can be determined relative to the machine's XYZ axis system. In some measuring probe systems, the probe communicates directly with the machine's control unit; in other probe systems, a probe interface is interposed between the probe and the machine's control unit. In any event, either within the machine's control unit or in the probe interface there is suitable software for converting the signals received from the contact sensors within the probe into position coordinates of the object contacted by the probe.

The probe 70 is mounted in the machine spindle 62 such that nominally the longitudinal axis of the stylus 72 is colinear with the axis of the spindle, which corresponds to the W axis of the machine. However, various abnormalities could cause the probe stylus to be other than colinear with the spindle axis. For instance, the stylus 72 could be bent. Additionally, even if the stylus is colinear with the spindle axis, if the contact sensors in the probe head 74 are not arranged so that they immediately detect deflection of the stylus (for example, if the contacts are bent), then the position measured by the probe will be inaccurate.

The probe 70 must also be mounted so that the tip of the probe is at a known distance from the rotational A axis of the machine when the spindle 62 is placed in a home or reference position along the W axis (for example, fully retracted or fully extended). This known distance is used in software programmed in the probe-machine interface or in the machine's control unit to calculate the position of an object contacted by the probe. If the probe tip is not at this known distance from the A axis, then the calculated position of the object will be inaccurate.

Probe Check Number 1: C-Axis Alignment

Figure 3:
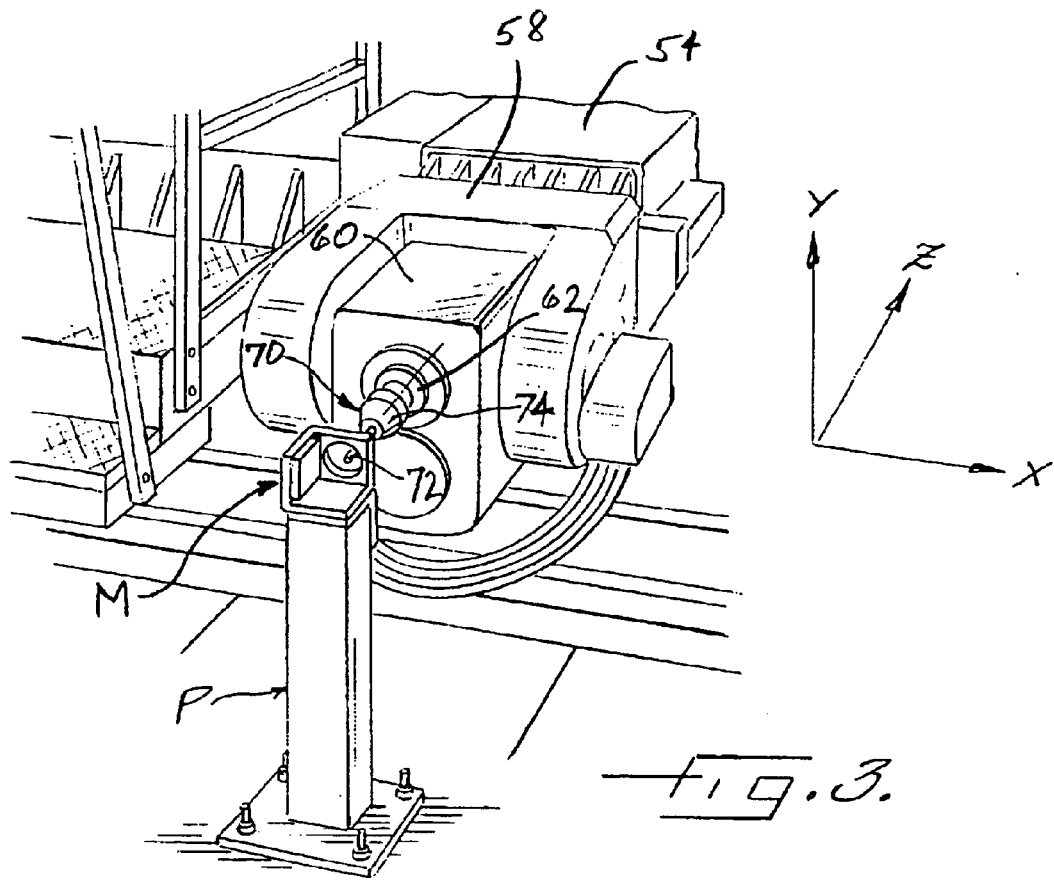
FIG. 3 is a perspective view of the machine during a probe check against a fixed monument for checking alignment of the probe with the rotational C axis of the machine.
Figure 4:
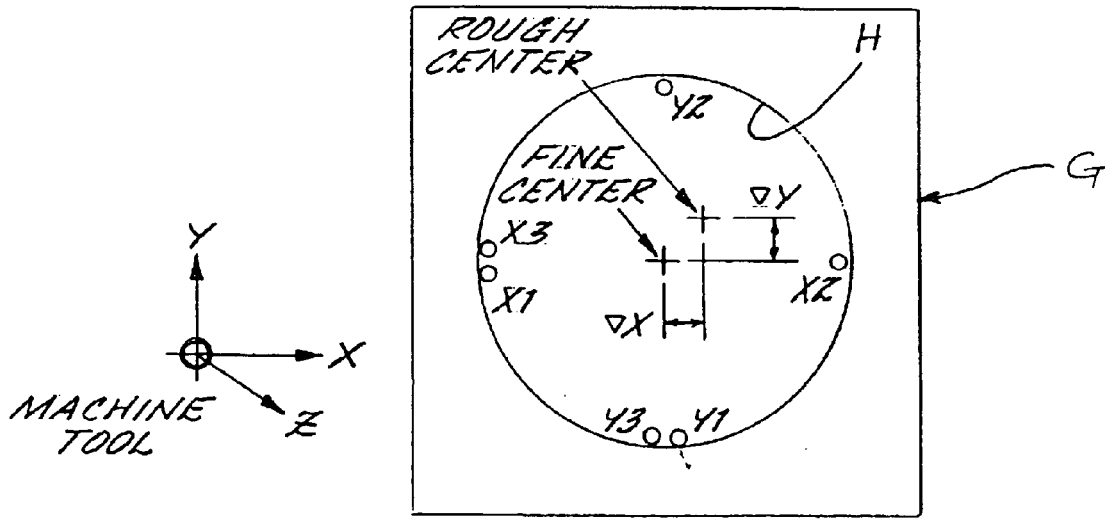
FIG. 4 is a side elevation of the monument depicting measurements that are made with the probe for assessing alignment of the probe with the C axis.

Accordingly, before the machine accuracy can be checked, it must first be assured that the probe is mounted properly and is functioning properly. This is accomplished by probing a fixed monument M with the probe. Initially, as shown in FIGS. 3 and 4, the probe 70 is checked to be sure it is aligned with the C axis of the machine when the body 60 is placed in its home position nominally having the spindle axis colinear with the C axis. The monument M advantageously comprises a ring gauge G or the like, comprising a flat metal plate defining a circular hole H of known diameter therethrough. The ring gauge G is mounted on a fixed pedestal P that is bolted or otherwise rigidly affixed to immobile structure such as the foundation or floor upon which the machine is installed. The ring gauge is mounted such that the plane of the hole H lies in the XY plane of the machine's nominal X, Y, Z axes (i.e., the axes defined by the linear ways as originally built according to factory specifications for the machine), and such that the center of the hole H is at a known X position and known Y position relative to these nominal axes. These known X and Y positions can be determined, for example, by probing the ring gauge (with the probe properly mounted and functioning properly) when the machine is known to be in accordance with original factory specifications and producing parts within acceptable tolerance. Thereafter, the machine positioning is judged relative to the known position of the ring gauge. Any discrepancies between the measured and known positions of the ring gauge can be due to a number of factors.

One such factor is a lack of the desired colinear relationship between the probe axis and the C axis of the machine when the body 60 is in its home position. To verify proper C axis alignment of the probe, as shown in FIGS. 3 and 4, the body 60 is rotated to its home position. The head 58 is rotated to a reference position relative to the ram 54, such as the illustrated position in FIG. 3 in which the A axis is parallel to the X axis of the machine. This may be defined as a zero-degree position of the head 58. With the head in the zero-degree position, the machine is moved such that the tip of the probe stylus is within the hole H of the ring gauge, and the control unit of the machine commands the machine to position the stylus at a Y position corresponding to the known Y position of the center of the hole H. The machine is then moved along the X direction until the stylus tip contacts the inner edge of the hole H at a first location and the X position of this point, denoted X1 in FIG. 4, is measured. Following this, the machine is moved in the opposite direction along the X axis until the stylus tip contacts the edge of the hole at the diametrically opposite point and the X location of this point, denoted X2, is measured. Next, the machine head 58 is rotated 180 degrees about the C axis, and the machine is moved along the X axis to cause the probe to contact the edge of the hole H at the location corresponding to X1, and the location of this point, denoted X3, is measured. Next, the machine is moved to place the stylus at an X position midway between X1 and X2, and the machine is moved in the Y direction to touch the probe tip against two diametrically opposite points on the edge of the hole H and the Y positions of these points, denoted Y1 and Y2, are measured. From the positions X1, X2, Y1, and Y2, the X and Y coordinates of the center of the hole are calculated. This center is denoted the "rough center" on FIG. 4. It will be recognized that only three of the four points are required to make the center calculation; the fourth point can serve as a check, or can be discarded.

Next, the machine head 58 is rotated 180 degrees about the C axis (i.e., back to the position the head was in for measuring X1 and X2), and the machine is moved to the position measured for the point Y1 until the stylus contacts the edge of the hole, and the Y position denoted Y3 is measured. Using X3, Y3, and one of the previously measured points X2 or Y2, the X and Y coordinates for the center of the hole H are again calculated; this center is denoted the "fine center" on FIG. 4. Any discrepancy between the rough and fine centers' X and/or Y positions indicates that there is some misalignment between the axis of the probe and the C axis. If the discrepancies exceed maximum acceptable amounts, then the cause of the discrepancies is traced and corrected. One possible cause, as noted above, is a bent stylus 72. Another possible cause is bent microswitches in the probe head 74, which causes the "brain" of the probe to think that the stylus is in other than its actual position when it contacts the monument. Yet another possible cause is non-perpendicularity of the A axis of the machine relative to the C axis. Each of the possible causes is investigated, and any problems found are corrected before proceeding to the next phase of the process.

Probe Check Number 2: Composite Tool Length

Once the C axis alignment of the probe 70 checks out satisfactorily, the next step is to verify that the length of the probe from the tip of the stylus 72 to the A axis of the machine is within a predetermined tolerance of a desired length. For this check, illustrated in FIGS. 5 and 6, the spindle 62 is translated in the W axis direction to a known reference or home position (e.g., fully retracted, fully extended, or some other reference position). The wrist 56 of the machine is placed in a position such that the A axis is parallel to the machine's Y axis and the W axis with which the probe 70 is aligned is parallel to the machine's X axis, as seen in FIG. 5. More specifically, the head 58 is rotated about the C axis 90 degrees from its home or zero-degree position, and the body 60 is rotated about the A axis 90 degrees from its home or zero-degree position. The machine is moved only along the X axis direction until the tip of the probe stylus 72 contacts one vertical edge of the monument's ring gauge G. The ring gauge G is formed by a rectangular or square plate having a known width w between its opposite vertical edges. The planar surfaces of the gauge's vertical edges are parallel to the YZ plane defined by the axes of the machine. The probe measures the X position of the one edge of the gauge G. The body 60 is then rotated 180 degrees about the A axis so that the probe 70 is pointing in the opposite direction along the X axis, the machine is moved along the X axis until the stylus tip contacts the opposite vertical edge of the gauge, and the X position of this edge is measured by the probe. Based on these two measurements of the X positions of the opposite edges of the gauge and the known width w of the gauge, the composite tool length L between the tip of the stylus and the A axis is calculated.

If the calculated composite tool length L is not within a predetermined tolerance of the desired value, then the cause of the discrepancy is traced and corrected. The composite tool length L can be inaccurate for various reasons. Three components, any of which can contribute to inaccuracy in tool length, include the body 60, the servo-drive (not shown) for the W-axis movement of the spindle, and the probe 70. Any shift in any of these parts is corrected so that the composite tool length L is the desired value before proceeding to the next phase of the process.

Probe Check Number 3: Repeatable Positioning of the Machine

Figure 7:
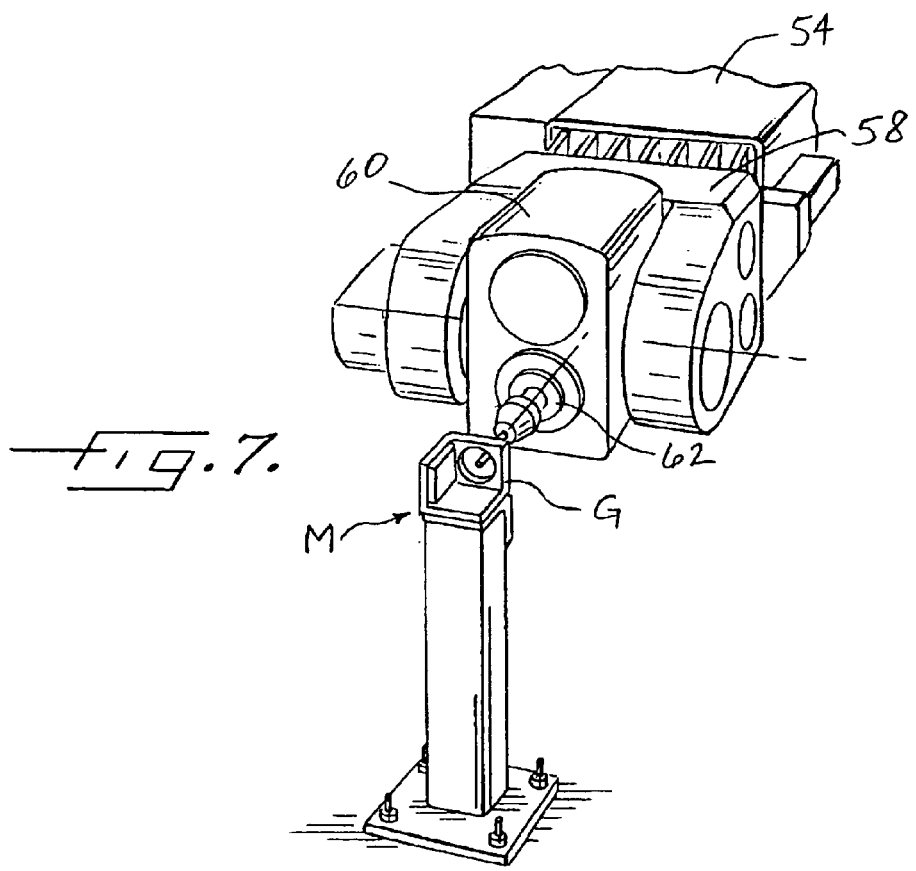
FIG. 7 is a perspective view of the machine during a probe check against the fixed monument for assessing repeatable positioning accuracy of the machine along its translational axes.
Figure 8:
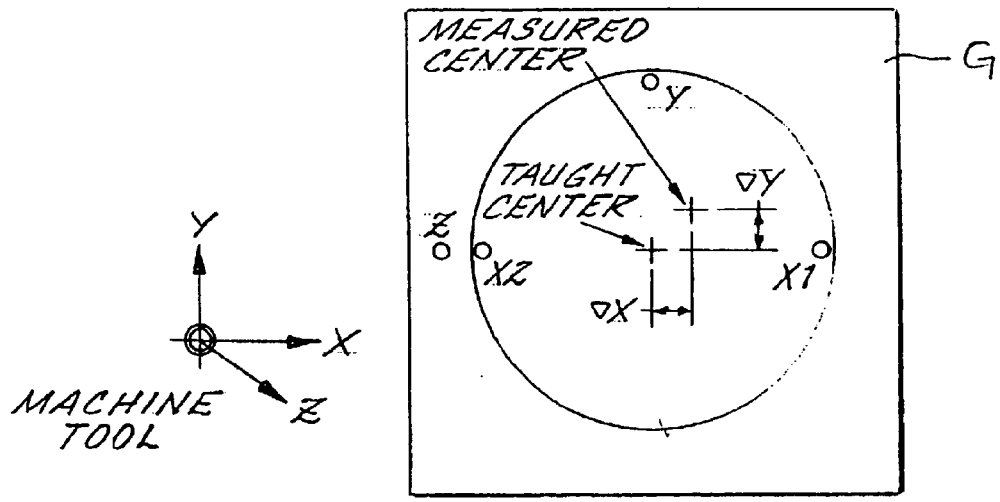
FIG. 8 is a side elevation of the monument depicting measurement that are made with the probe for assessing positioning accuracy of the machine.

Once the composite tool length checks out satisfactorily, the next step is to check how accurately the machine 40 can be positioned along each of its translational X, Y, and Z axes. As depicted in FIGS. 7 and 8, the machine is moved in the X and Y directions to cause the tip of the stylus to contact three circumferentially spaced points X1, X2, and Y on the edge of the hole H in the ring gauge G. From these three points, the X and Y coordinates of the center of the hole are calculated; this center point is denoted the measured center in FIG. 8. The measured center is compared to a previously taught center of the hole. The causes of any discrepancy in the X and/or Y positions of the center are traced and corrected. To check the Z positioning accuracy of the machine, the machine is moved in the Z direction to cause the stylus tip to contact a face of the ring gauge that is parallel to the XY plane. The Z position of the ring gauge's face is compared to a previously taught Z position for the face. The causes of any discrepancy between the measured and taught Z positions are traced and corrected before proceeding to the next phase of the process.

Probe Check Number 4: C-Axis Rotational Accuracy

Figure 9:
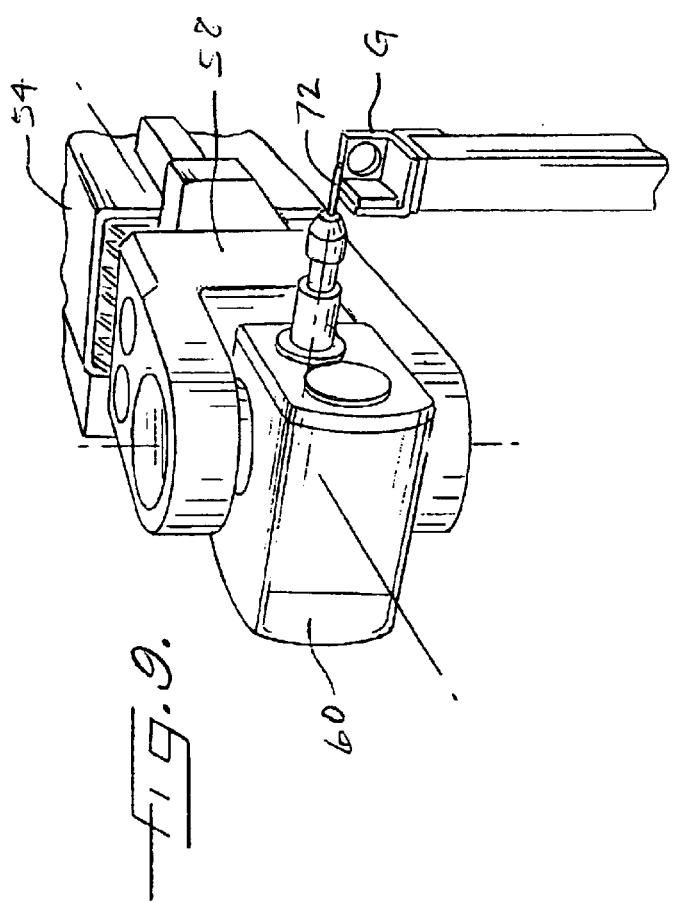
FIG. 9 is a perspective view of the machine during a probe check against the fixed monument for checking accuracy of rotational positioning of the machine about the C axis.
Figure 10:
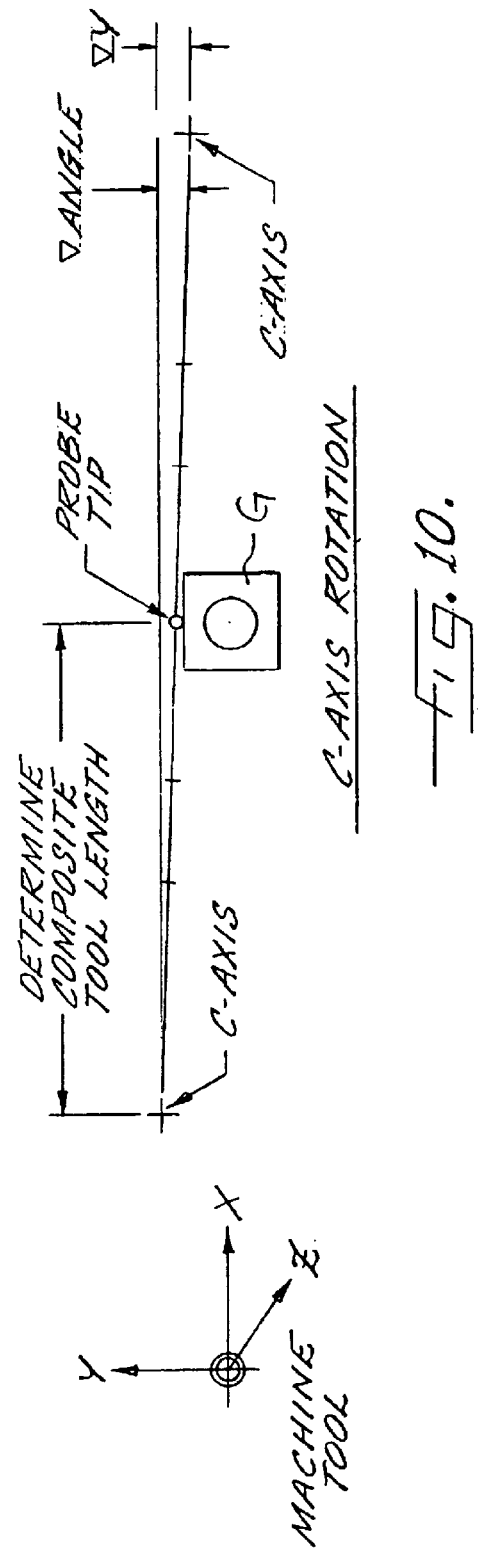
FIG. 10 is a side elevation of the monument depicting measurements that are made with the probe for checking accuracy of rotational positioning of the machine about the C axis.

The final probe check against the monument is illustrated in FIGS. 9 and 10. This check determines whether the machine's rotational positioning about the C axis is accurate. The head 58 of the machine wrist 56 is rotated 90 degrees from its home or zero-degree position such that the A axis nominally should be parallel to the Y axis. The body 60 is rotated such that the W axis is perpendicular to the A axis. Thus, if the machine is set up properly, the W axis should be parallel to the X axis. The machine is moved to cause the tip of the stylus to contact the upper edge of the ring gauge G. The planar upper edge of the ring gauge is parallel to the XZ plane. The probe measures the Y position of this upper edge of the gauge. The body 60 is then rotated 180 degrees about the A axis, and the machine is again moved to cause the stylus tip to contact the upper edge of the gauge so as to measure a second value for the Y position of the upper edge. If the A axis of the machine is in fact parallel to the Y axis of the machine, then the two Y positions of the upper edge will be equal. Any discrepancy between the two Y positions indicates some angular displacement of the A axis relative to the Y axis direction, which means the head 58 of the machine is not truly in the 90-degree position. Based on the composite tool length and the difference between the two measured Y positions, the angular displacement of the A axis relative to the Y axis is calculated. If this angular displacement is not within a predetermined tolerance of zero, then the cause of the displacement is traced and corrected before proceeding with machining operations or before proceeding with further checks of the process of the invention.

The probe checks against the monument M depicted in FIGS. 3 through 10 advantageously are performed on a regular periodic basis. For example, the probe checks can be done daily before or in between machining operations. It is preferable to perform the probe checks 1 through 4 in the order described above, so that root cause errors can be determined and corrected in a logical progression. Thus, the C-axis alignment and composite tool length are verified before proceeding to the machine repeatability and C-axis rotation checks, since these checks can be made accurately only by first verifying the accuracy of C-axis and probe alignment and probe length. By performing the four probe checks on a regular periodic basis, machine inaccuracies are caught and corrected before they can cause parts to be produced out of tolerance.

Probe Checks of Fixture

Figure 11:
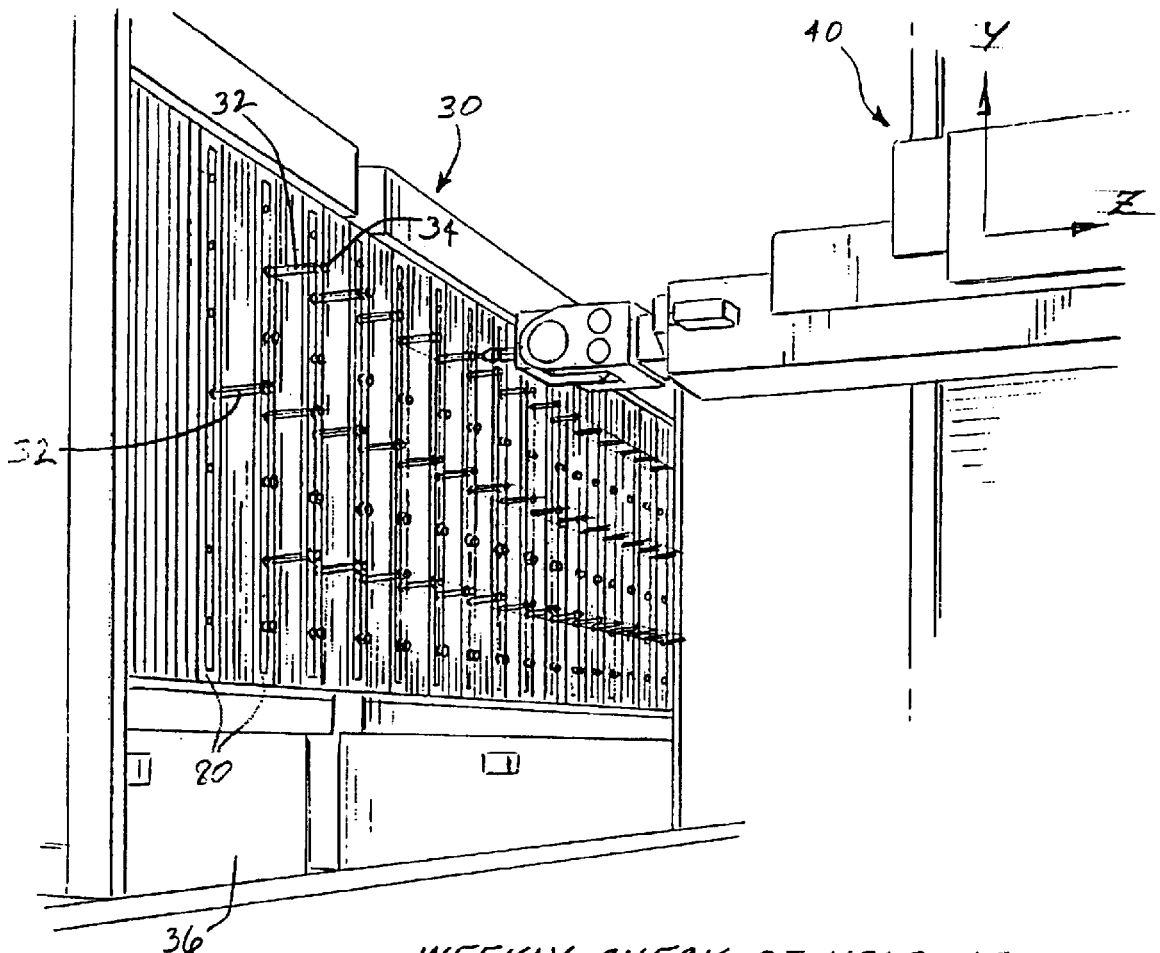
FIG. 11 is a perspective view depicting a probe check of the holding fixture.

The probe checks against the monument of course are not capable of determining whether the holding fixture 30 is positioning workpieces accurately. Accordingly, a separate check of fixture accuracy is performed in accordance with the invention. The fixture accuracy is checked using the same probe 70 mounted in the spindle of the machine. With reference to FIG. 11, the fixture 30 has the extendable and retractable pogos 32 arranged in a rectangular array of rows that extend parallel to the X axis of the machine and columns that extend parallel to the Y axis of the machine. The pogos 32 in each column are mounted on a column member 80 that can be translated by a suitable actuator (not shown) back and forth in the X axis direction. The fixture also includes actuators (not shown) for translating individual pogos 32 up and down along their column member 80 in the Y axis direction. Each pogo 32 is also extendable and retractable along the Z axis direction, as already noted. Thus, any given pogo 32 can independently undergo three mutually orthogonal translations in the X, Y, and/or Z direction.

For machining aircraft fuselage panels or similar types of large workpieces, the holding fixture 30 suitably can comprise a Universal Holding Fixture (UHF) manufactured by MTorres of Pamplona, Spain and marketed under the trademark TORRESTOOL®. Each pogo 32 has a vacuum assembly 34 mounted on its end that faces the machine 40. Although not visible in the drawings, it will be understood that the vacuum assembly 34 includes a vacuum cup with holes connected to a suitable source of vacuum. The vacuum cup is mounted such that when the workpiece is suctioned onto the vacuum cup, the workpiece is urged against a rigid reference surface of the pogo so as to be accurately positioned in the Z direction relative to the pogo. The pogos 32 have a substantial range of travel in the Z direction, advantageously at least about 24 inches in the particular embodiment of the machining system described and illustrated herein.

If parts are to be machined accurately, the positions of the pogos 32 relative to the machine must be accurately repeatable. The accuracy of positioning of the pogos is checked by probing the pogos with the probe 70 mounted in the machine spindle. FIG. 11 depicts this process. For purposes of the fixture check, a number of constant-Z planes are defined within the Z range of travel of the pogos; for example, five planes at Z=0.0 inches, 6.0 inches, 12.0 inches, 18.0 inches, and 24.0 inches can be defined. The fixture check begins with a pre-calibration check in which the pogos are placed at their home positions in the X and Y directions and at a constant Z position corresponding to one of the defined planes. The intended X, Y, and Z positions of the pogos used by the numerical control unit 36 of the fixture may or may not agree with the actual positions of the pogos relative to the machine's axes. To determine whether there are any discrepancies between the intended and actual positions of the pogos, the machine is moved to each of a plurality of the pogos and is moved along the Z direction to cause the tip of the stylus to contact a reference surface of the pogo that should nominally be at the intended Z position. The machine also probes reference surfaces of the pogo along the X and Y directions that should nominally be at the intended X and Y positions. Thus, X, Y, and Z coordinates are measured for each pogo that is probed. As indicated in FIG. 11, alternate rows of pogos may be probed rather than every row. Differences between the measured X, Y, and Z coordinates and the intended coordinates are calculated for each probed pogo. If the differences are within acceptable limits of zero, then the pre-calibration has been satisfactorily completed. If the differences are not within acceptable limits of zero, then a software correction is applied within the numerical control unit 36 of the fixture.

More particularly, the differences between the measured and intended X, Y, and Z positions of the pogos are applied as zero offsets within the numerical control unit. For instance, if a pogo was commanded by the fixture's control unit to be positioned at Z=24.0 inches but the machine probe measured the Z position as 24.01 inches, the difference of 0.01 inch is applied as a zero offset so that the zero reference position of the fixture actuator is adjusted by 0.01 inch.

Advantageously, the pre-calibration check of the fixture is performed on a scheduled basis, such as weekly. Each week, the fixture can be placed in a different configuration from the previous week. For instance, a total of ten fixture configurations can be defined based on five different Z positions for the odd-numbered rows of pogos and five different Z positions for the even-numbered rows of pogos. A different one of the ten configurations can be used each week for ten weeks, then the sequence of configurations can be repeated over the next ten weeks, and so forth. This approach minimizes the time required for the pre-calibration check (compared to running more than one configuration each week, for example), but still catches inaccuracies that may be confined to only certain ranges of the working envelope in a timely fashion so that they can be corrected.

It should also be noted here that the holding fixture further includes a pair of fixturing devices 38 that include locator pins (not shown) that fit into locator holes formed in predetermined places on the opposite ends of the workpiece W for aligning the workpiece relative to the holding fixture and for supporting the workpiece when the vacuum is not being applied to the vacuum assemblies. One of the fixturing devices 38 has a set point block (not shown) mounted on it to serve as a reference for the machine 40 so that the machine can be calibrated to the workpiece prior to starting a machining operation. The calibration is performed by moving the machine to probe the set point block in the X, Y, and Z directions, and the machine's control unit establishes the measured positions of the set point block as zero reference values for purposes of its numerical control program for the workpiece. The set point block advantageously is located at approximately the vertical midpoint of the workpiece W.

If the fixture fails the pre-calibration check, then after the software corrections have been applied, a post-calibration check of the fixture is performed. In the post-calibration check, the fixture is probed in each of a plurality of different configurations, for example with the pogos at two different Z positions, two different Y positions, and three different X positions. Differences between the intended positions and the measured positions are again calculated. If the differences are not within acceptable limits of zero, then the software corrections made to the fixture are not adequate to solve the problem with the fixture. This can be due to some nonlinearity in the behavior of the fixture, misalignment of the fixture axes relative to the machine axes, wear of fixture components, and other potential causes. Physical intervention is taken to trace and correct the source or sources of the errors in fixture positioning. The post-calibration check ensures that the fixture accuracy is acceptable throughout the entire working envelope of the machine. Once the machine probe checks of the fixture have been successfully passed, there is a high degree of confidence that the desired master-slave positional relationship exists between the machine 40 and the fixture 30.

Global Machine Accuracy Check

Figure 12:
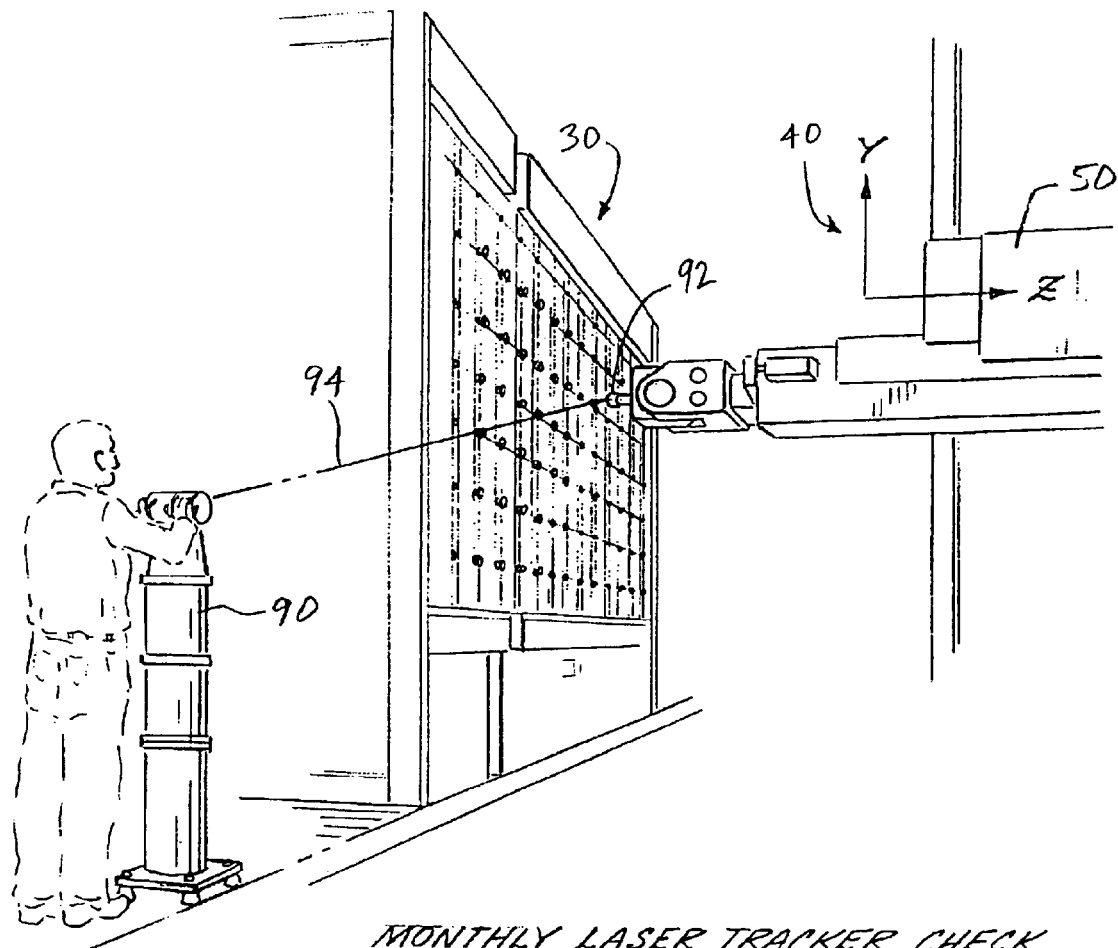
FIG. 12 is a perspective view depicting a laser tracker being used to check global positioning accuracy of the machine along its translational axes.

The next phase of the process for qualifying the accuracy of the machining system in accordance with the invention is to perform a global positioning accuracy check of the machine 40. This is depicted in FIGS. 2 and 12. With reference first to FIG. 12, the accuracy of the machine positioning along its translational X, Y, and Z axes is checked using an independent position-measuring system advantageously comprising a laser tracking unit 90 and a reflective target 92 (best seen in FIG. 2) that is mounted in the spindle 62 of the machine where a machine tool would ordinarily be held during machining. The reflective target 92 comprises a cat eye type of semi-spherical reflector. The laser tracking unit 90 is operable to emit a laser beam 94 and direct the beam onto the reflector 92 such that the beam is reflected back to the laser tracking unit 90, where it is detected by a detector (not shown). The head of the laser tracking unit rotates independently about perpendicular horizontal and vertical axes so that the laser beam 94 can be directed in any direction in a spherical space surrounding the laser tracking unit. The laser tracking unit is operable to automatically rotate the head of the unit via suitable actuators (not shown) so that the reflected beam always strikes the detector in the same location. Based on the angular positions of the head about its two rotational axes, the bearing from the laser tracking unit 90 to the target 92 is calculated. Based on the elapsed time between sending the incident beam 94 to the target 92 and the detection of the reflected beam at the laser tracking unit, the distance to the target from the laser tracking unit is calculated. The bearing and distance are used to calculate coordinates of the target 92 in an orthogonal x, y, z axis system used by the laser tracking unit. A suitable tracking system of the described type is the SMART 310 laser tracking system available from Leica of Heerbrugg, Switzerland. It should be understood that a laser tracker is not the only type of device that can be used for the present purposes. Other highly accurate three-dimensional measuring instruments can be used, such as 3-D laser measuring instruments of the "point-and-shoot" type that do not automatically track the target but measure its position when the laser beam is impinged on the target. An example of such a point-and-shoot laser measuring instrument is the model LTD500 instrument made by Zeiss.

Figure 13A:
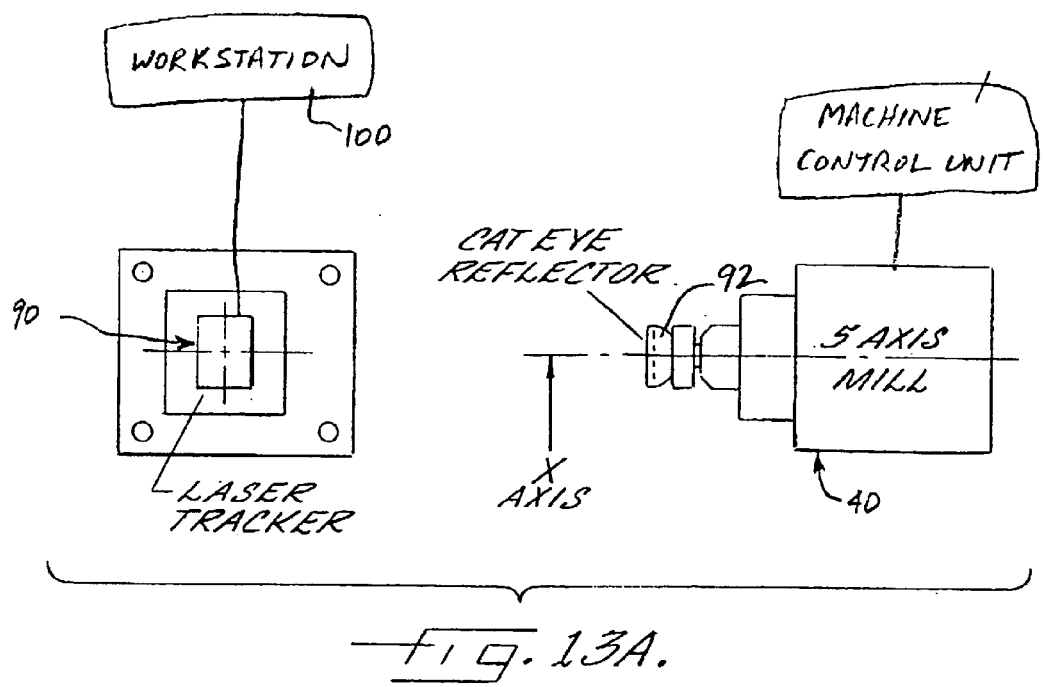
FIG. 13A is a schematic top elevation of the laser tracking test setup.
Figure 13B:
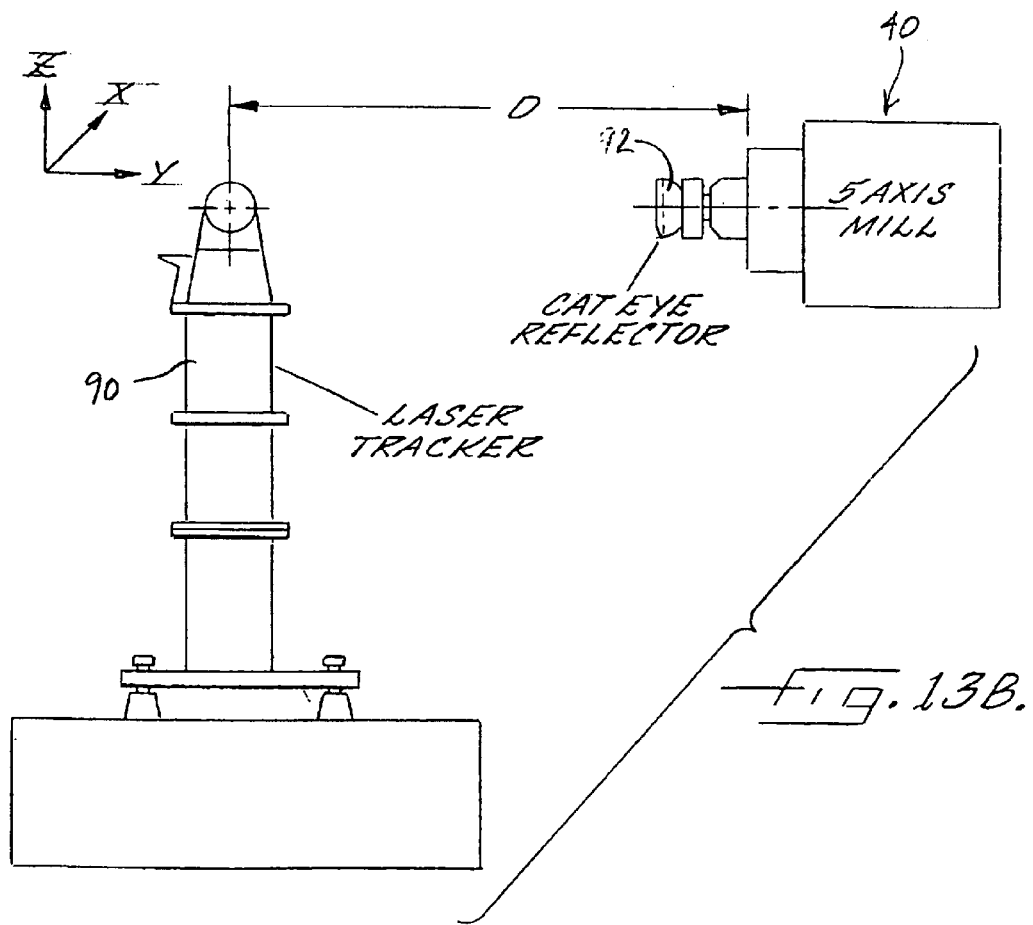
FIG. 13B is a schematic side elevation of the laser tracking test setup.

With reference to FIGS. 13A and 13B, the laser tracking unit 90 is mounted in a fixed position proximate the machine 40 at a known distance D, for example 46 ∀ 1 inches, from the head of the tracking unit to a reference surface of the machine 40 along the Z axis direction of the machine. With respect to the X axis of the machine, the laser tracking unit is positioned at a known X position such as X=!60.0 inches (with X=0.0 inches corresponding generally to the left-hand end of the fixture 30 in FIG. 12).

As a first step toward checking the global positioning accuracy of the machine along its X, Y, and Z axes, a master frame of reference is created in the laser tracking unit. Significantly, the master frame of reference is relative to the ways of the machine 40 as opposed to being relative to a foundation-based reference system such as ground and gravity. First, the machine is positioned at the middle of its working envelope along the Y and Z axis directions, and the Y, Z, W, A, and C axes of the machine are fixed. The machine is run along the X axis direction from one end of the working envelope to the other end. At a plurality (e.g., eleven) of points spaced apart along the travel of the machine, the laser tracking unit 90 measures the XYZ coordinates of the target 92 and these points are stored in a personal computer or workstation 100 in communication with the laser tracking unit. The machine is then positioned in the middle of the working envelope along the X and Z directions and the X, Z, W, A, and C axes are fixed. The slide 50 is run along the Y axis direction from the bottom to the top of the working envelope. At a plurality (e.g., ten) of points spaced apart along the travel of the slide, the laser tracking unit measures the XYZ coordinates of the target 92 and these points are stored in the workstation 100. Using the points acquired along the X and Y travel of the machine, a curve-fitting program resident within the workstation 100 calculates a best linear fit of the points to determine an orthogonal set of coordinate axes defining a master frame of reference.

This master frame of reference is then used when checking the positioning accuracy of the machine along its various axes. As diagrammatically illustrated in FIG. 14, the machine is moved along its X, Y, and Z axes so as to position the target 92 at each of a plurality of points (e.g., 216 points) spaced throughout the three-dimensional working envelope E of the machine. Advantageously, the points are arranged on four constant-Z planes spaced apart in the Z direction; for example, the Z planes can be at Z=20.0 inches, 28.0 inches, 36.0 inches, and 44.0 inches. In each Z plane, a rectangular array of X, Y points is defined (e.g., nine points spaced 40 inches apart along the X direction and six points spaced 20 inches apart along the Y direction). At each point, the coordinates of the target 92 in the master coordinate system are measured by the laser tracking unit 90. The coordinates of the points are stored in the workstation 100. The measured X, Y, and Z positions for each point are compared with the intended values, i.e., the values that the numerical control unit of the machine drove the machine to when positioning the machine. Discrepancies between the measured and intended position values that exceed maximum acceptable amounts indicate a need for physical intervention to correct the cause or causes of the discrepancies.

Figure 16:
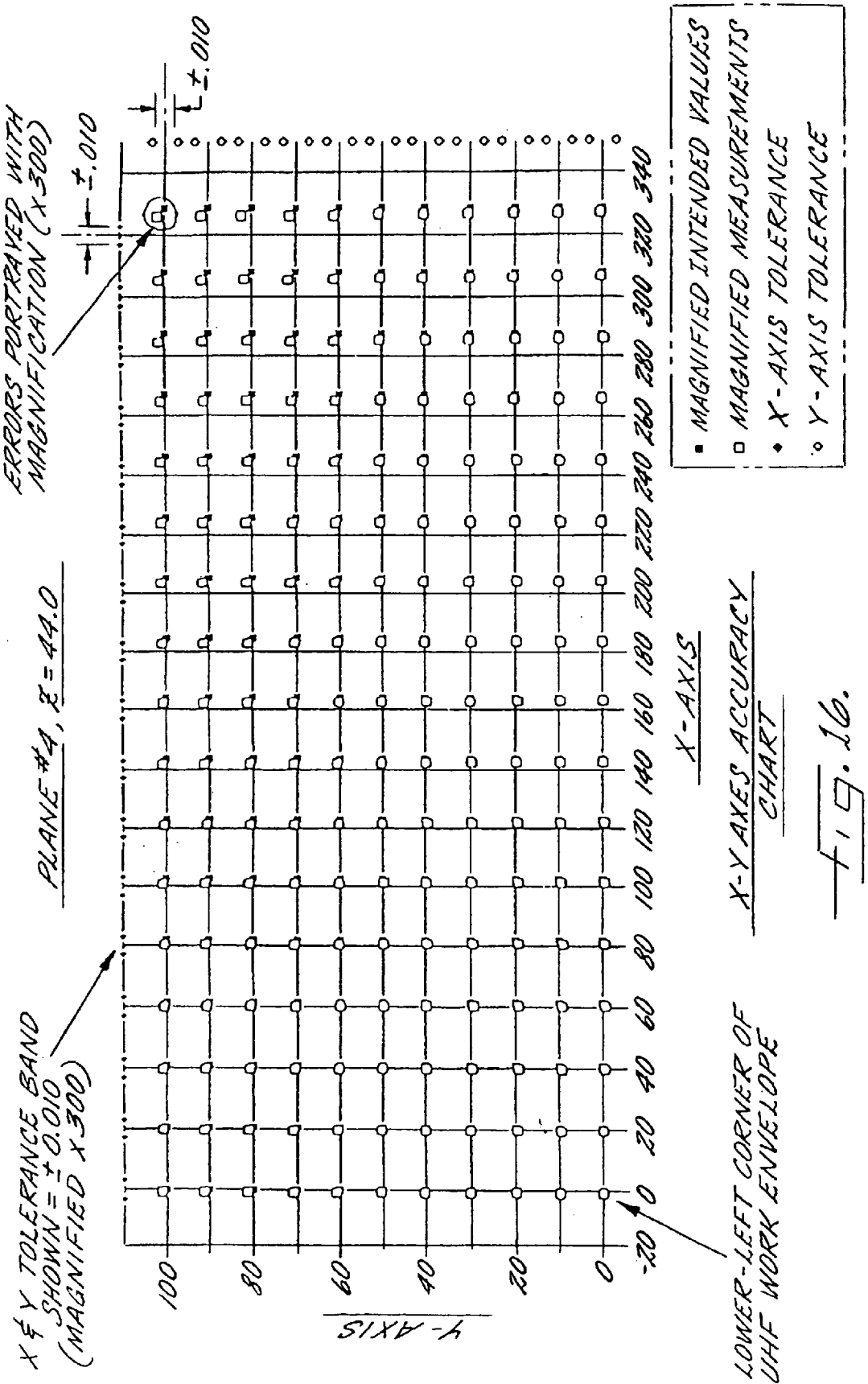
FIG. 16 is an illustrative example of a chart for showing results of the global positioning accuracy check of the machine.
Figure 17:
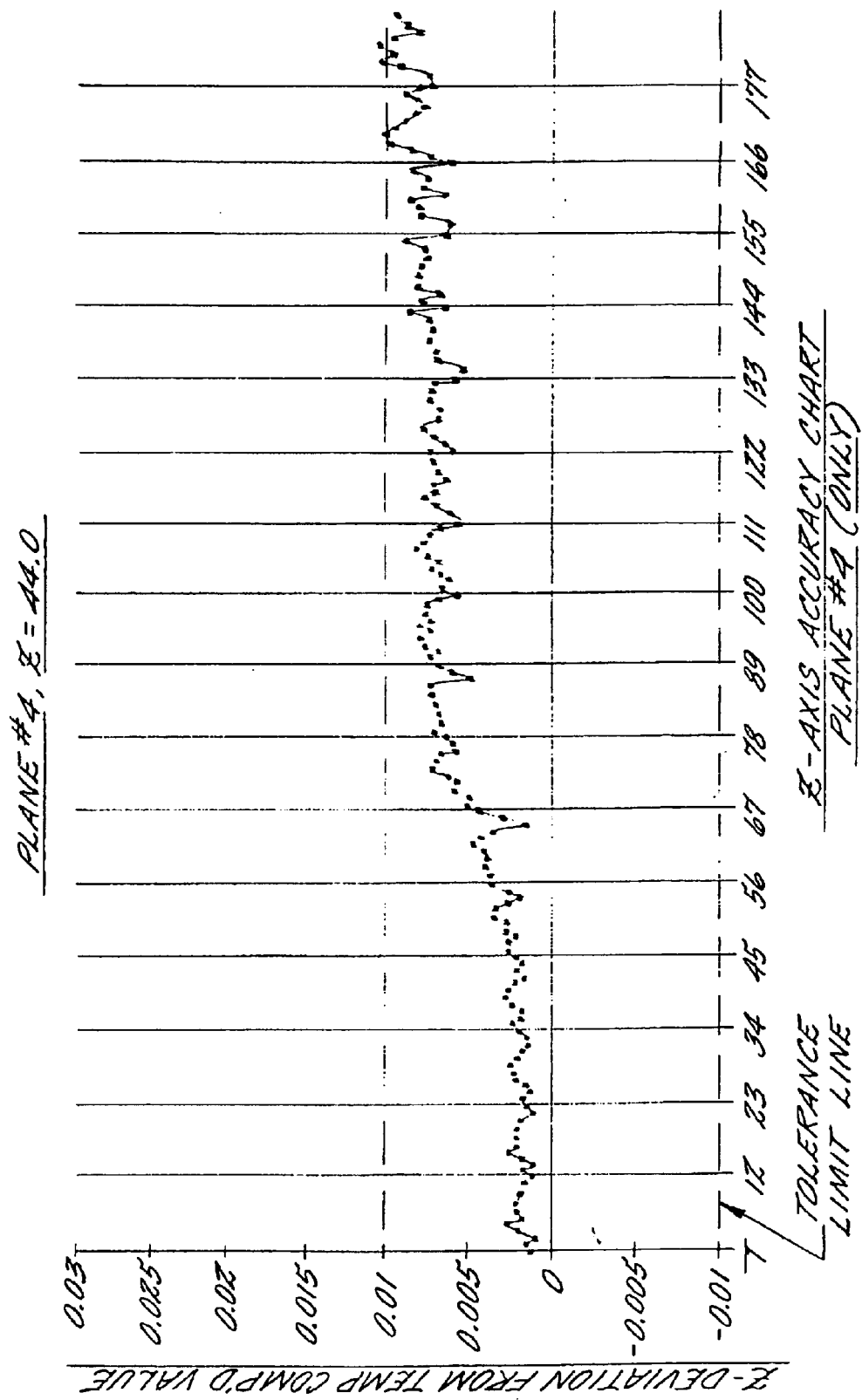
FIG. 17 is an illustrative example of another chart for showing results of the global positioning accuracy check of the machine.

Various types of charts can be created for graphically displaying the measured versus intended positions of the machine. FIG. 16 depicts one such chart for simultaneously displaying both the X and Y position discrepancies relative to maximum allowable tolerances for one of the constant-Z planes. This chart makes it easy to identify those regions of the machine's working envelope in which the errors exceed the allowable amount. FIG. 17 depicts a chart for displaying the discrepancies in the Z positions of the points in one of the constant-Z planes. The difference between measured and intended Z position is plotted on the vertical axis versus the point number on the horizontal axis; the point numbering system is shown in FIG. 14, and generally proceeds from the lower left-hand corner to the upper right-hand corner of the working envelope. The upper and lower tolerance limits are shown in dashed lines. With charts such as those in FIGS. 16 and 17, the operator can immediately see if there are problems that need addressing. The trends exhibited by the data also give insight into what the likely source of the problem may be.

Following the accuracy check of the machine's X, Y, and Z axes, a check of the W, A, and C axes is made with the laser tracking unit. As depicted in FIG. 2, the X, Y, and Z axes of the machine are fixed, and the machine wrist 56 is moved through a series of rotations about the A and C axes and translations of the spindle along the W axis. The machine is stopped at each of a plurality of points and position coordinates of the target 92 are measured by the laser tracking unit 90 for each point. The coordinates of the points are stored in the workstation 100. In a manner similar to that described above, discrepancies between the measured positions and the intended positions of the target 92 are graphically displayed on charts (not shown) so that the operator can readily detect when there is a problem that requires physical intervention to correct.

Figure 15:
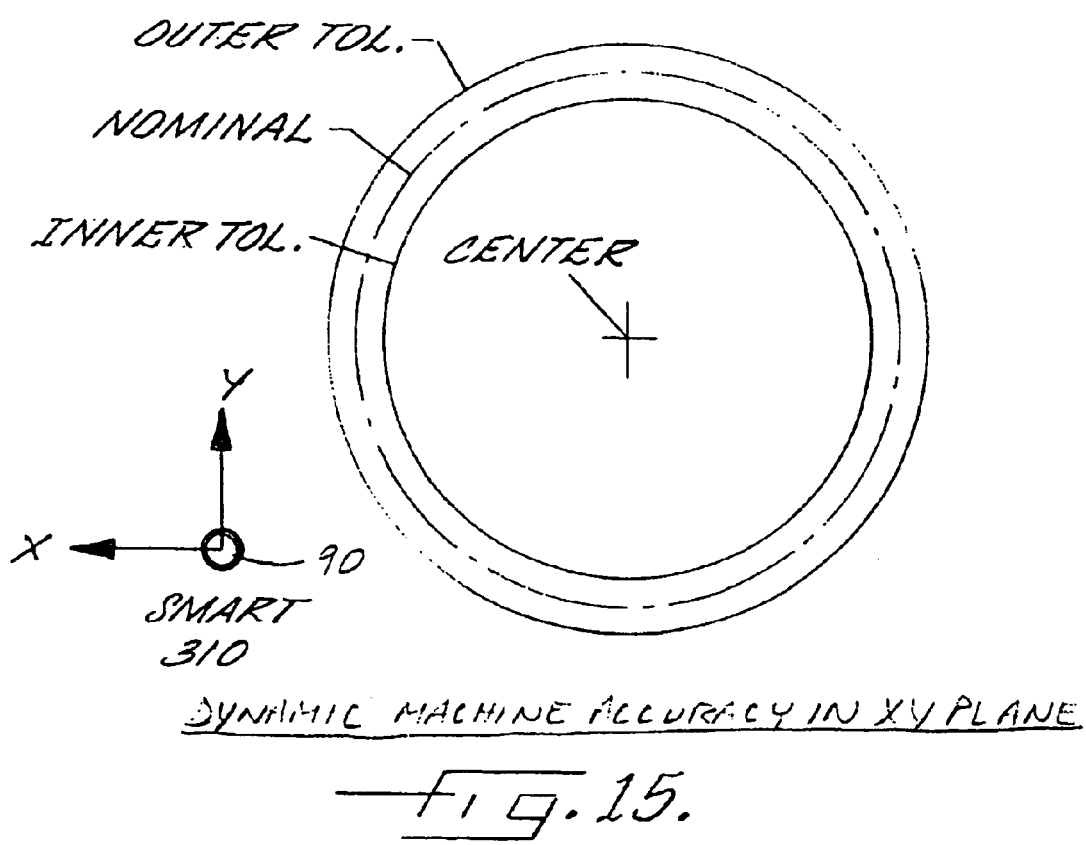
FIG. 15 is a diagrammatic illustration of a dynamic positioning accuracy check of the machine in the XY plane of the machine.

FIG. 15 depicts a dynamic machine accuracy check that can be made with the laser tracking system. The machine is commanded to move the target along a predetermined path such as a circular path corresponding to the path labeled as "nominal" in FIG. 15. Of course, paths other than circular could be used, such as rectangular, elliptical, oval, or the like. The nominal path lies in a plane that is parallel to the XY plane of the machine. As the machine moves in the circular path, the actual position of the target is measured by the laser tracking unit at a series of points spaced about the circumference of the path. For various reasons, the actual path of the target will deviate from the nominal path. Deviations between the actual and nominal paths are calculated and compared with maximum allowable amounts indicated by the circles labeled "outer tolerance" and "inner tolerance" in FIG. 15. If the deviations exceed the maximum allowable amounts, then physical intervention is taken to correct the cause or causes of the excessive deviations. Similar dynamic accuracy checks are made for the XZ and YZ planes by moving the machine about circular paths in these planes and checking for excessive deviations between the intended and actual paths of the target.

The global positioning accuracy checks with the laser tracking system advantageously are performed on a scheduled periodic basis, such as monthly. Thus, the process in accordance with a preferred embodiment of the invention involves regularly scheduled daily, weekly, and monthly checks designed to identify machine and/or fixture inaccuracies early and to correct the problems before out-of-tolerance parts are produced. The process is also designed to minimize the amount of physical intervention (i.e., hardware adjustments) required to maintain a desired level of confidence that parts will be produced within acceptable tolerances.

Figure 18:
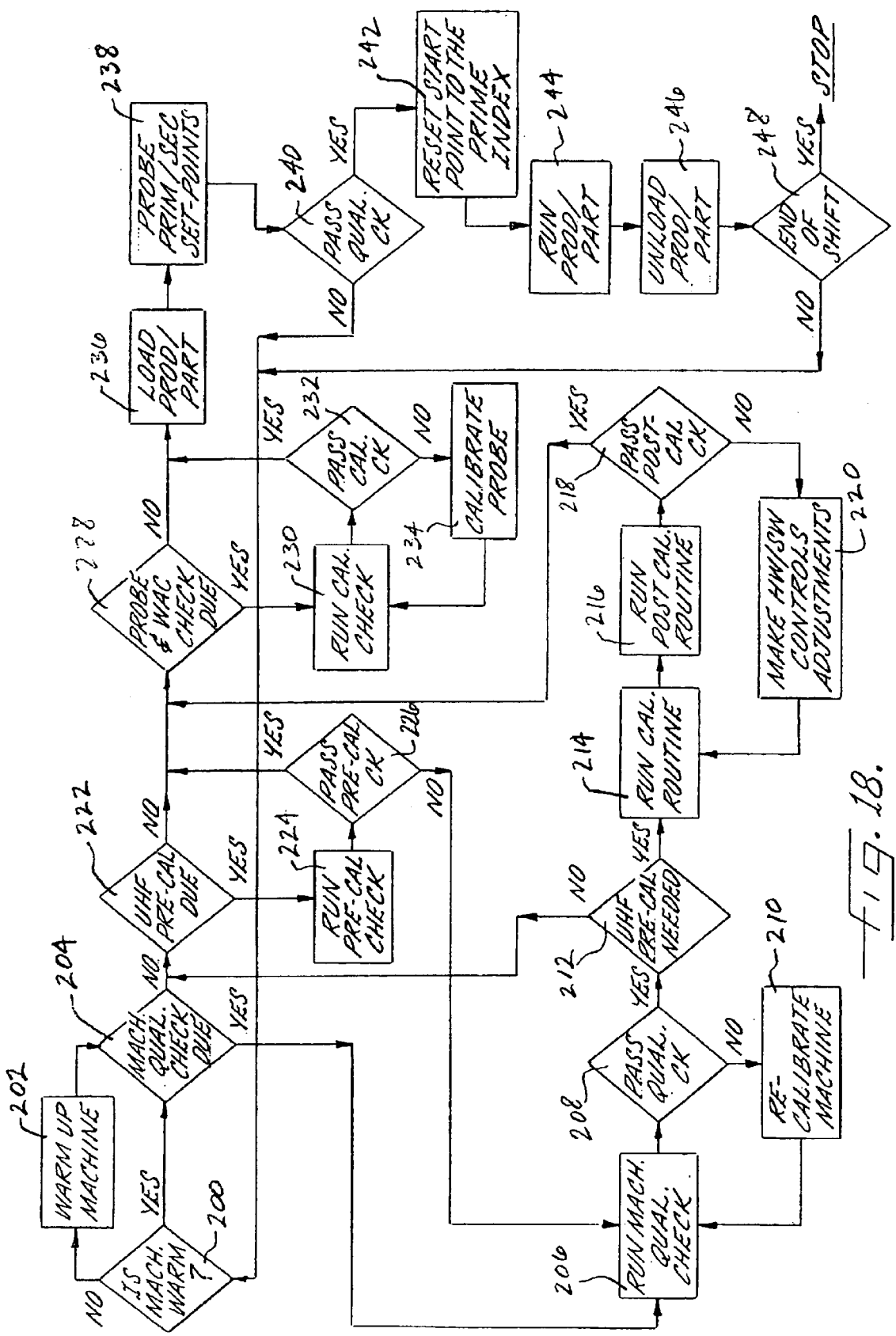
FIG. 18 is a flow chart depicting one embodiment of a process in accordance with the present invention for qualifying accuracy of the machine system.

FIG. 18 depicts in flow-chart form a process in accordance with a preferred embodiment of the invention for qualifying the accuracy of the machining system. With the machine 40 and fixture 30 powered up, the process begins at 200 with a check to determine if the machine has been properly warmed up so that it is thermally stable. If the machine has not reached thermal stability, the machine is warmed up as indicated at 202. Once the machine is warmed up, a check is made as indicated at 204 to determine whether the next regularly scheduled machine global positioning accuracy check (denoted the machine qualification check in FIG. 18) is due to be performed. As previously noted, the global accuracy check is conducted on a monthly basis. If the global check is due, then it is run as indicated at 206. A check is made at 208 to determine whether the machine passed the machine qualification check; if not, then the machine is recalibrated to ground and gravity at 210. Once the machine passes the qualification check, then a check is made at 212 to determine whether the holding fixture requires a pre-calibration check with the probe. For example, the pre-calibration would generally be performed if the machine required physical adjustment in order to pass its accuracy check at 206. If the fixture requires a pre-calibration check, then this check is made and software corrections are applied in the control unit of the fixture to calibrate the fixture as indicated at 214. A post-calibration check of the fixture is then made as indicated at 216. At 218, if the post-calibration check fails, then hardware adjustments and perhaps software adjustments as well are made to the fixture as indicated at 220. The fixture calibration and post-calibration checks are then repeated until they are successfully passed.

Going back to step 204 of the process, if the machine qualification check is not due, then a check is made at 222 to determine whether the next regularly scheduled calibration check of the fixture is due. If it is due, then the pre-calibration check is performed as indicated at 224. At 226, if the pre-calibration check is failed, then the process proceeds to steps 206 through 220 as describe above. If the pre-calibration check is passed, then the process proceeds to step 228 where a determination is made whether the next regularly scheduled probe checks against the fixed monument are due. If they are due, then these probe checks are performed as indicated at 230. At 232, if any of the probe checks are failed, then calibration of the probe or other physical adjustments are made to the probe and/or the machine at 234. Once the probe checks are passed, the part to be machined is loaded into the holding fixture as indicated at 236. At 238, with the probe installed in the machine spindle, a series of primary and secondary set points on the workpiece are probed to verify that the workpiece is located in the proper location relative to the machine. At 240, the measured positions of the primary and secondary set points of the workpiece are compared with the intended values, and if the differences between measured and intended positions are within acceptable limits, then the machining and unloading of the workpiece proceed in steps 242 through 246. At 248, if it is not the end of the shift, then the process begins again at step 200.

Math Model Relating Production Part Accuracy to Machine System Parameters

Another aspect of the present invention is the manner in which the errors or tolerances of the machine and holding fixture are distributed in order to keep the resulting accuracy in machining parts within acceptable limits. The math model preferably employs a statistical summation of all of the error sources. A maximum allowable value for the statistical total error is established. The math model is then used to determine the maximum allowable error in each machine parameter that can be tolerated and still maintain an acceptable confidence that the total error will not exceed its maximum allowable value.

Figure 19:
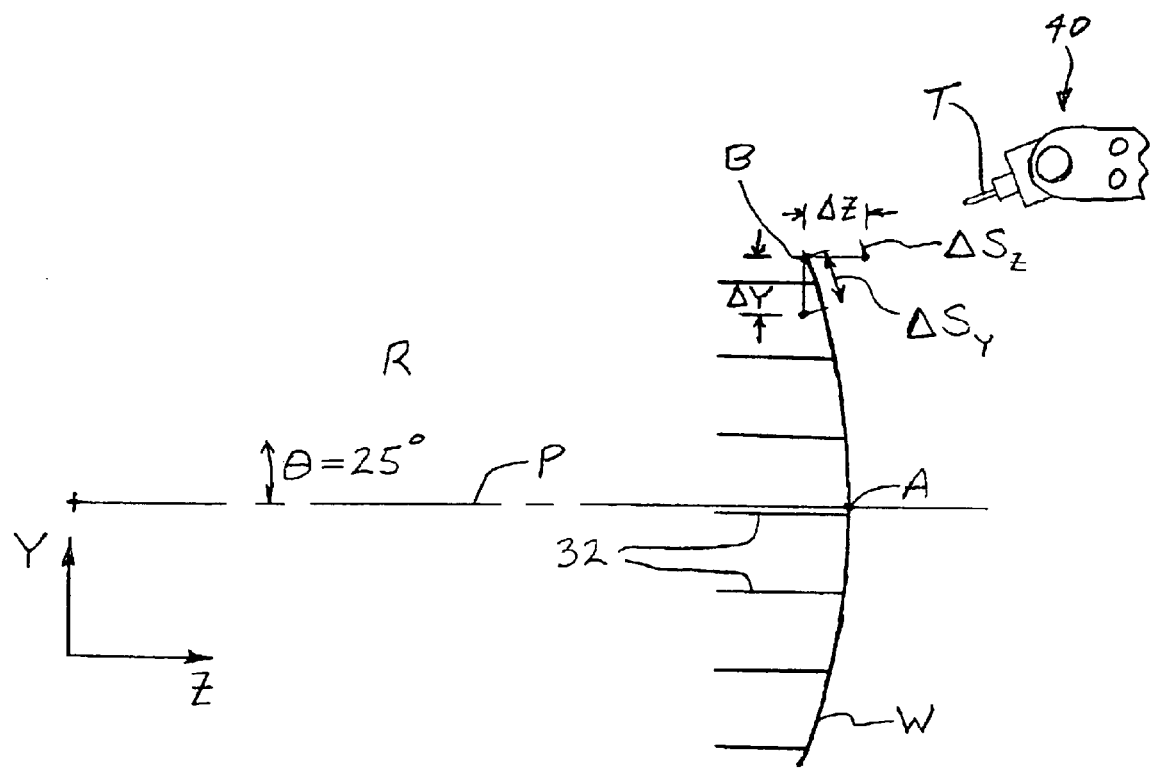
FIG. 19 schematically depicts a panel mounted on the holding fixture and shows the relation between Y and Z axis errors and the resulting error in positioning along the panel.

The math model and the distribution of machine system tolerances are explained by reference to a specific example illustrated schematically in FIG. 19. A panel W such as a fuselage panel is shown in side view (i.e., viewed along a direction parallel to the machine's X axis) mounted on the vacuum cup-equipped pogos 32 of the holding fixture. The panel has a radius of curvature R in the YZ plane. The point B represents a point at which it is desired to drill a hole through the panel. The point B is located a running distance S along the curved panel in the YZ plane from the horizontal XZ plane P that bisects the panel into upper and lower halves (i.e., the distance S is measured along the panel from point A to point B). The point B is located at an angle of inclination $\angle$ from the plane P. An example of $\angle=25°$ is shown as the maximum angle of inclination at the upper edge of the panel.

It is desired from a production accuracy standpoint for the distance S to be maintained within a certain tolerance. If the machine 40 and/or the holding fixture is inaccurate in its Y and/or Z positioning, the hole drilled by the machine tool T will not be located precisely at the point B, but will be offset from the point B by an amount $\Delta S$ as indicated in FIG. 19. It should be noted that errors in the X direction can also contribute toward hole mislocation, but it can be shown that for a panel having a small curvature in the X direction, as for example aircraft fuselage panels, the error contributions from X positioning errors are very small and can be ignored. If there is an error $\Delta Y$ in the Y direction, the resulting position error $\Delta S_Y$ in the hole location is given by $$\Delta S_Y = \Delta Y \cos \angle.$$

Similarly, if there is an error $\Delta Z$ in the Z direction, the resulting position error in the hole location is given by $$\Delta S_Z = \Delta Z \sin \angle.$$

Errors in the Y and Z positioning can arise from various sources, as should be apparent from the foregoing description of the machine system and its various components. Thus, the holding fixture pogos may be out of position in the Y and/or Z direction; additionally, the vacuum cup assemblies on the ends of the pogos may be slightly out of position. The position error associated with the pogos and vacuum cups is denoted $\Delta S_{pogos}$ herein, and is given by $$\Delta S_{pogos} = \Delta R = \Delta \{[(R \sin \angle + Y_{pogos})^2 + (R \cos \angle + Z_{pogos})^2]^{1/2} - R\}.$$

Another fixture-related source of potential error can arise if the set point block mounted on the fixturing device 38 (FIG. 1) is out of position in the Z direction; this position error is denoted $\Delta S_{sp}$ herein, and is given by $$\Delta S_{sp} = \sin \angle \Delta Z_{block}.$$

A further error source is inaccuracy in the C-axis alignment causing a shift $\Delta Y_C$ in the position of the machine tool tip. This position error is denoted $\Delta S_C$ herein, and is given by $$\Delta S_C = \cos \angle \Delta Y_C.$$

Another error source is inaccuracy ΔL in the composite tool length L (FIG. 6) of the machine tool. This position error is denoted ΔS$_{CTL}$ herein, and is given by $$\Delta S_{CTL} = \sin 2A \cdot \Delta L.$$

The W, A, and C axes of the machine can also contribute toward errors in the Y and Z positioning. These errors are denoted ΔS$_{WAC, y}$ and ΔS$_{WAC, z}$ herein, and are given by $$\Delta S_{WAC, y} = \cos 2A \cdot Y_{WAC},$$

$$\Delta S_{WAC, z} = \sin 2A \cdot Z_{WAC}.$$

The Y and Z positioning of the machine as a whole can also contribute toward inaccuracy in the location of the hole machined through the workpiece. These errors are denoted ΔS$_{M, Y}$ and ΔS$_{M, Z}$ herein, and are given by $$\Delta S_{M, Y} = \cos 2A \cdot Y_M,$$

$$\Delta S_{M, Z} = \sin 2A \cdot Z_M.$$

Similarly, various other error sources can contribute toward inaccuracy in the location of the machined hole in the workpiece, including Y-positioning error in the locator pin used for aligning the workpiece on the holding fixture as previously described, offset of the drill axis relative to the C-axis of the machine, wander of the drill on entry, bowing of the workpiece between pogos, and others. Each error source is determined in terms of its error contribution ΔS$_i$ in a manner analogous to the other error sources described above.

The statistically summed total error, ΔS$_{Total}$, is determined in one embodiment by assuming that each variable causing errors is normally distributed about its mean and is independent from all of the other variables. Accordingly, the total error can be determined by a root sum square as $$\Delta S_{Total} = (\Sigma \Delta S_i^2)^{1/2}.$$

This equation assumes that it is statistically improbable that all of the errors will go in one direction so as to cause the total error to exceed the value determined by the equation.

In accordance with the present invention, a maximum allowable value for the total error ΔS$_{Total}$ is first determined based on production tolerance considerations. For example, for a panel workpiece as shown in FIG. 19 having a radius of curvature of 74 inches, a maximum allowable total error ΔS$_{Total}$ is specified as 0.03 inch. This is the maximum allowable amount by which the hole position can be mislocated and still be acceptable. Based on this total error, the maximum allowable value for each of the error components ΔS$_i$ is determined. It will be appreciated that there are many different combinations of values for these error components that will satisfy the constraint of ΔS$_{Total}$ ≤ 0.03 inch. However, an additional constraint on each component is that the maximum allowable error must be realistically achievable by the machine. For instance, it would be unrealistic to set the maximum allowable error in Y positioning of the machine 40 to be 0.0001 inch because it would be difficult or impossible to keep the machine within this accuracy band. Accordingly, empirical experience with the machine and holding fixture accuracy capabilities will generally inform the decisions on what maximum error should be assigned to each error source.

FIG. 20 depicts a table showing one possible solution for distributing the various machine tolerances enabling the total error goal to be achieved. By choosing tolerance values for each error source that are realistically achievable, it is possible to maintain the machine system in a condition allowing production parts to be produced within acceptable tolerance with a minimum of physical intervention required for realigning the machine and/or fixture. A unique feature of the invention is that the math model directly relates production part accuracy to the machine and fixture axes and parameters that are checked for accuracy during the above-described machine accuracy qualification process. Thus, the invention enables the machine system to be qualified for accuracy in a manner providing a high degree of confidence that production parts will be produced within tolerance. The invention thus allows much of the usually required part inspections to be eliminated.

In a more general sense, the invention provides a method for relating the magnitudes of all of the potential errors, (e.g., the ΔY, ΔZ, and other error sources described above) to the resulting error ΔS in the machine tool (e.g., the drill bit for drilling a hole). It will be recognized that the equation relating a given machine or fixture error, to the machine tool position error ΔS will generally be of the form $$\Delta S = f(\cdot) \Delta F,$$

where f(·) is a function of the error, and F is a function of the geometry of the workpiece. For example, the workpiece geometry function F may be a function of the radius of curvature and/or the orientation of the workpiece surface through which the hole is to be drilled. In the example of the panel workpiece described above, the function F is dependent on the angle of inclination 2 of the intended hole location. Thus, the basic notion is to derive an equation that takes into account the geometry of the workpiece set-up and determines the error in machine tool position that would be created if the machine and/or holding fixture were inaccurate in its positioning of some component thereof by an amount. Such an equation is derived for each of the components or movements of the machine that may cause a machine tool position error.

Next, a statistical method for aggregating all of the various machine tool position error components is determined. In the example given above, the method chosen was based on the assumption that the error sources were all normal distributions and independent of one another, and hence a simple root sum square aggregation was used. It will be recognized, of course, that this is only one possible statistical summation method among many possible ones, and hence other methods could be used (e.g., a Weibull method). Once the statistical summation method has been determined, it is then possible to relate the maximum allowable machine tool position error to all of the individual error components. Maximum allowable values for each of the machine system errors, are established that will enable the system to produce parts with a high statistical likelihood that the machine tool position error will be less than the maximum allowable position error. As noted above, these maximum allowable errors, should be established in such a manner that they are realistically achievable and maintainable with a minimum amount of physical intervention required. The machining system is checked for accuracy by measuring machine and fixture errors to determine whether each of the errors is within its maximum allowable amount. If any error exceeds its allowable amount, then the cause of the error is traced and corrected. In the case of the holding fixture, software corrections can be applied to zero out the errors in many instances.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for assessing accuracy of positioning of a multi-axis numerically controlled machine, the machine being of the type having a tool-holding spindle mounted on a ram that is movable along each of at least two mutually orthogonal translational axes, the machine having a numerical control unit for controlling positioning of the spindle, the method comprising:

mounting a target on the machine adjacent the spindle and mounting a measuring instrument in a fixed position proximate the machine, the measuring instrument being operable to measure position coordinates of the target;

creating a master frame of reference relative to the translational axes of the machine by:

moving the machine along a first of the translational axes and using the measuring instrument to determine the coordinates of the target at each of a plurality of spaced-apart points along the first translational axis;

moving the machine along a second of the translational axes orthogonal to the first translational axis and using the measuring instrument to determine the coordinates of the target at each of a plurality of spaced-apart points along the second translational axis; and calculating a linear fit of the determined coordinates so as to create a set of mutually orthogonal axes defining the master frame of reference; and checking accuracy of positioning of the machine in the master frame of reference by moving the machine so as to position the spindle at each of a plurality of locations, measuring the coordinates of the target in the measuring instrument for each said location, and determining errors in positioning of the machine by comparing the measured coordinates with machine-determined coordinates determined within the numerical control unit of the machine.

2. The method of claim 1, wherein the method is adapted to check accuracy of positioning of a numerically controlled holding fixture used in conjunction with the machine for holding a workpiece to be machined, the fixture having a plurality of numerically controlled, movable holding members operable to engage the workpiece, the method further comprising:

placing each of a plurality of the holding members of the fixture in a fixed position;

mounting a measuring probe in the spindle of the machine, the probe being operable to cause the machine to determine a position of an object when the probe contacts the object;

moving the machine to each of said plurality of the holding members such that the probe contacts the holding member and the machine determines a position of the holding member along at least one axis of the master frame of reference;

causing the fixture to internally determine a position of each holding member that is probed by the machine; and comparing the machine-determined position of each of said plurality of the holding members with the position of the holding member determined within the holding fixture.

3. The method of claim 2, further comprising calibrating the holding fixture by applying software corrections within a numerical control unit of the holding fixture so as to compensate for differences between the machine-determined position and the fixture-determined position of one or more of the holding members.

4. The method of claim 3, further comprising performing a post-calibration check of the holding fixture by placing each of a plurality of the holding members in a plurality of fixed positions and moving the machine such that the probe contacts the holding member in each of the fixed positions, and comparing a machine-determined position of the holding member with a fixture-determined position of the holding member for each of the fixed positions.

5. The method of claim 4, further comprising making hardware adjustments to at least one of the holding fixture and the machine when a difference between the machine-determined position and the fixture-determined position of one or more of the holding members determined during the post-calibration check exceeds a maximum allowable difference.

6. The method of claim 1, further comprising:

causing the machine to move along a predetermined path such that the target is moved along an actual path in space;

measuring the position of the target with the measuring instrument as the machine moves the target along the actual path such that the actual position of the target is determined at a plurality of points along the actual path; and calculating a deviation between the actual position of the target at each point and an intended position corresponding to the predetermined path.

7. The method of claim 6, wherein the machine is operable to move the spindle independently along each of three mutually orthogonal X, Y, and Z axes, and wherein the machine is programmed to move along a predetermined path in each of XY, XZ, and YZ planes such that the target traverses an actual path nominally located in each plane, and the measuring instrument is used to track the target along each of the actual paths and deviations between actual positions and intended positions of the target are calculated at points along each path.

* * * * *